(12) United States Patent
Sumiyoshi et al.

(10) Patent No.: US 9,386,279 B2
(45) Date of Patent: Jul. 5, 2016

(54) INFORMATION PROCESSING APPARATUS, INFORMATION PROCESSING METHOD, AND INFORMATION PROCESSING SYSTEM

(71) Applicants: Shinichi Sumiyoshi, Kanagawa (JP); Tetsuo Yamashita, Kanagawa (JP); Fumihiro Hasegawa, Tokyo (JP); Miyuki Oda, Shizuoka (JP); Yuusuke Ohta, Kanagawa (JP); Yuka Kihara, Kanagawa (JP); Masahiko Itoh, Kanagawa (JP)

(72) Inventors: Shinichi Sumiyoshi, Kanagawa (JP); Tetsuo Yamashita, Kanagawa (JP); Fumihiro Hasegawa, Tokyo (JP); Miyuki Oda, Shizuoka (JP); Yuusuke Ohta, Kanagawa (JP); Yuka Kihara, Kanagawa (JP); Masahiko Itoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 164 days.

(21) Appl. No.: 14/100,522

(22) Filed: Dec. 9, 2013

(65) Prior Publication Data
US 2014/0164852 A1 Jun. 12, 2014

(30) Foreign Application Priority Data

Dec. 10, 2012 (JP) ................................ 2012-269712

(51) Int. Cl.
*G06F 11/00* (2006.01)
*H04N 7/15* (2006.01)
(Continued)

(52) U.S. Cl.
CPC .............. *H04N 7/155* (2013.01); *H04L 43/045* (2013.01); *H04L 43/0823* (2013.01);
(Continued)

(58) Field of Classification Search
CPC .. H04N 7/155; H04L 43/045; H04L 43/0823; H04L 51/30; H04L 51/34; H04L 65/4015; H04L 65/403; H04L 67/38; H04L 69/40; H04L 12/1813; H04L 12/1831; H04L 12/1863; G06F 11/0709; G06F 11/0748; G06F 11/0766; G06F 11/0769; G06F 11/3089; G06F 11/32

See application file for complete search history.

(56) References Cited

U.S. PATENT DOCUMENTS 5,857,074 A * 1/1999 Johnson ......................... 709/217
7,945,621 B2 * 5/2011 Yuan et al. ..................... 709/204
(Continued)

FOREIGN PATENT DOCUMENTS

JP 06-311510 11/1994
JP 09-163328 6/1997
(Continued)

OTHER PUBLICATIONS

Welcome to the yommoo—the sticky note whiteboard, May 2, 2012, http://www.yommoo.com, retrieved from the internet archive with a capture date of May 2, 2012.*
(Continued)

*Primary Examiner* — Marc Duncan
(74) *Attorney, Agent, or Firm* — Harness, Dickey & Pierce, P.L.C.

(57) ABSTRACT

An information processing apparatus includes a receiving unit receiving data input to one or more apparatuses; a data storage unit storing the data with a determined display position thereof in a display screen; a log storage unit storing a data change as a log; an association unit monitoring a communication status of a communication with the one or more apparatuses, and associating information indicating an apparatus where a communication error occurs and a timing when the communication occurs with the log; a recording unit recording video of the data change displayed in the display screen from when the communication error occurs until when the communication is recovered for an apparatus; and a transmission unit transmitting the video from an event when the communication error occurs until an event when the communication is recovered and the log to the apparatus.

7 Claims, 25 Drawing Sheets

(51) Int. Cl.
*H04L 29/14* (2006.01)
*H04L 29/06* (2006.01)
*H04L 12/58* (2006.01)
*H04L 12/26* (2006.01)
*G06F 11/07* (2006.01)

(52) U.S. Cl.
CPC ............ *H04L 51/30* (2013.01); *H04L 65/403* (2013.01); *H04L 65/4015* (2013.01); *H04L 67/38* (2013.01); *H04L 69/40* (2013.01); *G06F 11/0709* (2013.01); *G06F 11/0769* (2013.01); *H04L 51/34* (2013.01)

(56) References Cited

U.S. PATENT DOCUMENTS

| | | | |
|---|---|---|---|
| 8,948,354 B2* | 2/2015 | Katis et al. | 379/93.01 |
| 9,129,258 B2* | 9/2015 | Alexandrov | G06Q 10/10 |
| 9,131,059 B2* | 9/2015 | Jones | H04M 3/568 |
| 2003/0167418 A1 | 9/2003 | Zhu et al. | 714/4 |
| 2007/0300179 A1* | 12/2007 | Friedlander | 715/781 |
| 2008/0046490 A1* | 2/2008 | Williams et al. | 708/107 |
| 2010/0150320 A1* | 6/2010 | Lingafelt et al. | 379/68 |
| 2010/0174783 A1* | 7/2010 | Zarom | 709/205 |
| 2011/0099006 A1* | 4/2011 | Sundararaman et al. | 704/208 |
| 2011/0289429 A1* | 11/2011 | Berry et al. | 715/752 |
| 2012/0102373 A1* | 4/2012 | Waugh | 714/57 |
| 2012/0331395 A2 | 12/2012 | Kummerfeld et al. | |
| 2013/0022330 A1* | 1/2013 | Carter et al. | 386/224 |
| 2013/0057707 A1 | 3/2013 | Hasegawa et al. | |
| 2013/0117373 A1 | 5/2013 | Umehara | |
| 2013/0242033 A1 | 9/2013 | Kato et al. | |
| 2013/0339431 A1* | 12/2013 | Yannakopoulos et al. | 709/204 |
| 2014/0258406 A1* | 9/2014 | Salesky et al. | 709/204 |
| 2015/0293650 A1* | 10/2015 | Dukhovny | G06F 3/0482 715/732 |
| 2015/0381936 A1* | 12/2015 | Goyal | H04N 7/15 348/14.06 |

FOREIGN PATENT DOCUMENTS

| | | |
|---|---|---|
| JP | 2011-523739 | 8/2011 |
| JP | 4753842 | 8/2011 |
| JP | 2012-050063 | 3/2012 |
| JP | 2012-134941 | 7/2012 |

OTHER PUBLICATIONS

Wong, Jessica Cam, The 6 Best Free Online Meeting Tools to Collaborate With Your Team, Jan. 3, 2011, http://www.makeuseof.com/tag/6-free-online-meeting-tools-collaborate-team/.*

* cited by examiner

STICKY NOTE DATA

| (x,y) | (180,60) | (800,120) |
|---|---|---|
| (a) | (4) | (4) |
| (w,h) | (60,40) | (50,30) |
| (i) | (BIT MAP DATA) | (BIT MAP DATA) |

INFORMATION PROCESSING APPARATUS, INFORMATION PROCESSING METHOD, AND INFORMATION PROCESSING SYSTEM

CROSS-REFERENCE TO RELATED APPLICATIONS

The present application claims priority under 35 U.S.C. §119 to Japanese Patent Application No. 2012-269712 filed on Dec. 10, 2012, the entire contents of which are hereby incorporated herein by reference.

BACKGROUND OF THE INVENTION

1. Field of the Invention

The present invention generally relates to an information processing apparatus and an information processing method communicating with another apparatus via a network, and an information processing system including the information processing apparatus.

2. Description of the Related Art

As an example method for meeting participants who bring their ideas, a method which may be called a "K-J method" is known. (The K-J method is named for its inventor's name.) In the K-J method, to bring ideas, the participants write their ideas on sticky notes, place the sticky note on a place where every participant can view, and then rearrange the positions of the sticky notes one after another during the meeting for grouping the ideas.

However, such rearrangement of (i.e., moving and arranging) the sticky notes is time-consuming work. Namely, this is an obstacle to carry out the K-J method. To resolve the problem, several techniques are known reducing such workload by computerizing the meeting to bounce ideas off each other in methods including the K-J method.

To reduce the workload, for example, there is a known technique to display documents input by the participants using pen tablets onto a shared screen by sending a scene of the participants among the participants, so as to conduct a brain storming session (see, for example, Japanese Patent Publication No. H06-311510).

SUMMARY OF THE INVENTION

According to an aspect of the present invention, an information processing apparatus includes a receiving unit receiving data input to one or more apparatuses; a data storage unit storing the data with a determined display position thereof in a display screen; a log storage unit storing a data change as a log, the data change being displayed in the display screen; an association unit monitoring a communication status of a communication with the one or more apparatuses, and associating information indicating an apparatus where a communication error occurs or an apparatus where the communication is recovered from the communication error and a timing when the communication error occurs or when the communication is recovered from the communication error with the log; a recording unit recording video of the data change displayed in the display screen from when the communication error occurs until when the communication is recovered for an apparatus; and a transmission unit, when the receiving unit receives a request for acquiring the video from an apparatus where the communication is recovered, transmitting the video from an event when the communication error occurs until an event when the communication is recovered and the log to the apparatus.

BRIEF DESCRIPTION OF THE DRAWINGS

Other objects, features, and advantages of the present invention will become more apparent from the following description when read in conjunction with the accompanying drawings, in which.

DETAILED DESCRIPTION OF THE PREFERRED EMBODIMENTS

In a case of an idea generation meeting, where, for example, the participants bring their ideas, based on a method such as the K-J method, if a communication error occurs (e.g., in the network), the discussion is interrupted, so that further discussion cannot be pursued.

For example, in the case of the meeting where the participants bring their ideas, if a communication error occurs, data cannot be exchanged directly among participants. However, even in that case, it is still desired to continue the meeting without interrupting the flow (direction) of the discussion.

However, actually, if such a communication error occurs on line, the flow of the discussion is interrupted, so that the thoughts of the users (participants) who are unable to participate due to the error in the meeting are interrupted. As a result, the users who are unable to participate in the meeting forget their thoughts to be presented, so that the meeting may end without good ideas sufficiently proposed during the meeting.

The present invention is made in light of the problem, and one object of the present invention is to make it possible for a user, who is unable to participate in a meeting due to a communication error, to return to the meeting smoothly in a computerized meeting to bounce ideas off of other among the users.

In the following, embodiments of the present invention are described with reference to the accompanying drawings.

First Embodiment

System

Figure 1:
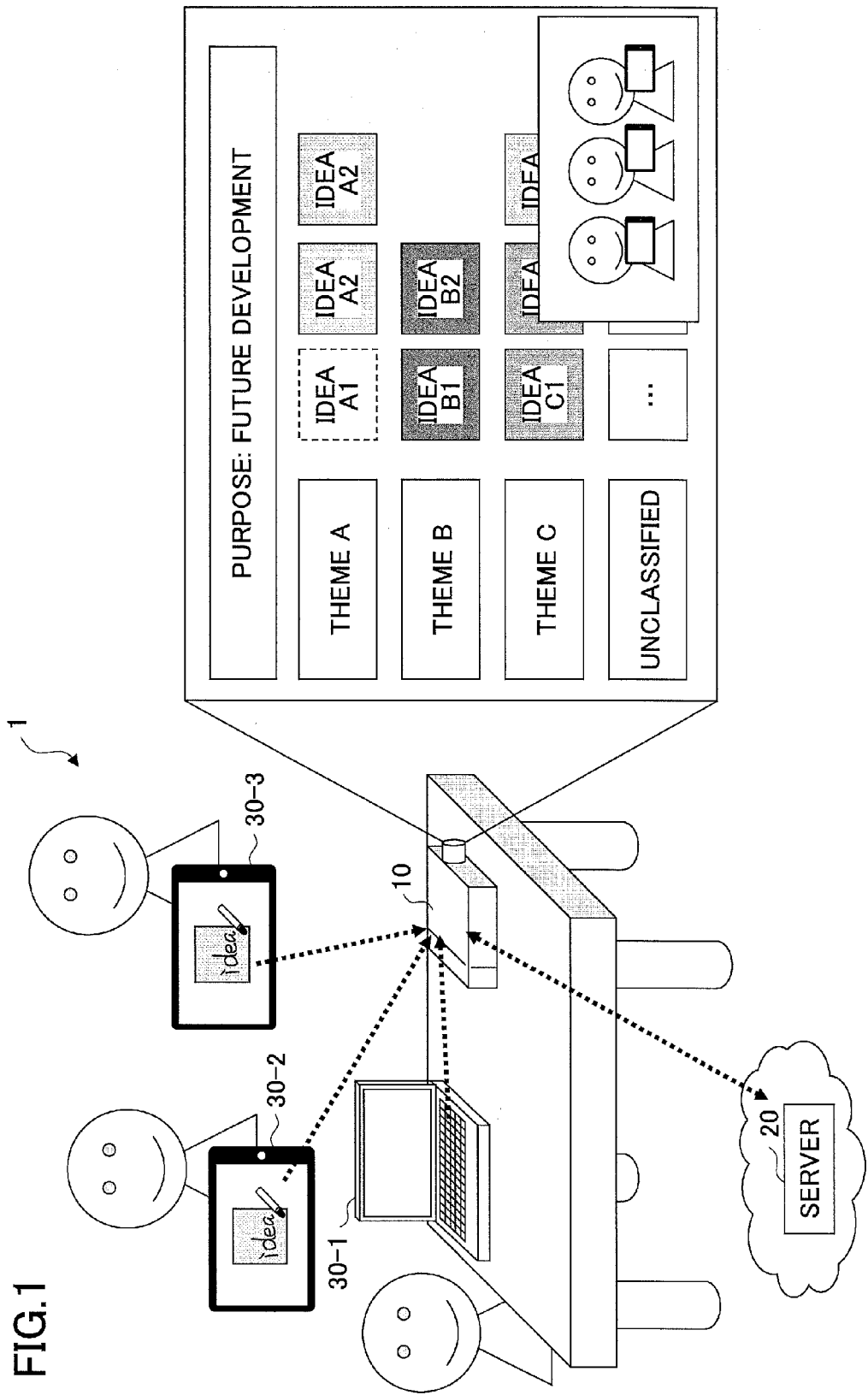
FIG. 1 is a drawing illustrating an example information processing system according to a first embodiment.

FIG. 1 shows an example information processing system 1 according to a first embodiment. As shown in FIG. 1, the information processing system 1 includes a projection apparatus 10, a server 20, a plurality of information processing apparatuses 30, which are connected to each other wirelessly or via cables, so that they can perform data transmission with each other. The server 20 may also be called the "information processing apparatus". The information processing system 1 may further include a meeting (conference) terminal (not shown) disposed between the projection apparatus 10 and the server 20.

The information processing system 1 herein is assumed to be used in, for example, the idea generation meeting. Hereinafter, the embodiments of the present invention are described assuming that the K-J method is used in the idea generation meeting. Further, the server 20 may be integrated in the projection apparatus 10 or the information processing apparatuses 30.

FIG. 1 shows an example where the information processing system 1 includes the information processing apparatuses 30-*n* (n=1, 2, and 3, where "n" is an integer greater than zero in general) which are connected to the server 20 via a network.

Hereinafter, the information processing apparatuses 30-*n* may be collectively referred to as "information processing apparatus 30" unless it is necessary to separately describe the information processing apparatuses.

The information processing apparatus 30 transmits the data of an idea (e.g., sticky note data on which the idea is described), that are input to the apparatus, to the server 20 via the projection apparatus 10. Further, the information processing apparatus 30 may directly transmit the data of the idea, that are input to the apparatus, to the server 20.

Upon receiving the data from the information processing apparatus 30, the server 20 sets (determines) the layout position in a predetermined display screen, and stores the corresponding data positional information. The "predetermined display screen" herein refers to a screen to display various information, and may be called a "shared view".

The "data positional information" includes attributes of various data. The "various data" includes, for example, the layout position, a size, and a magnification factor.

The server 20 transmits display screen information, which is the information of a display screen where the various data are laid out based on the data positional information, to the projection apparatus 10 and the information processing apparatus 30.

Upon receiving the display screen information from the server 20, the projection apparatus 10 projects a display screen in accordance with the display screen information on a projection surface. In this case, the projection apparatus 10 may includes a device for measuring a distance, so as to measure a distance to the projection surface and a distance to a pointing device or the like disposed between the projection apparatus 10 and the projection surface. Further, the device may also be called a "distance sensor".

The server 20 stores the display screen information ("shared view information") whenever the display screen information is generated, and transmits the past display screen information to projection apparatus 10 and the information processing apparatus 30 on a necessary basis.

Further, when data included in the display screen are changed, the server 20 stores the log indicating the data change. The server 20 transmits the past log to the information processing apparatus 30 on a necessary basis. Further, the server 20 may store the data change of the display screen as video data.

Further, it should be noted that the projection apparatus 10 is not always necessary. Namely, for example, the server 20 may transmits the display screen information to the information processing apparatus 30, so that the information processing apparatus 30 display the display screen based on the display screen information.

Concept

Figure 2:
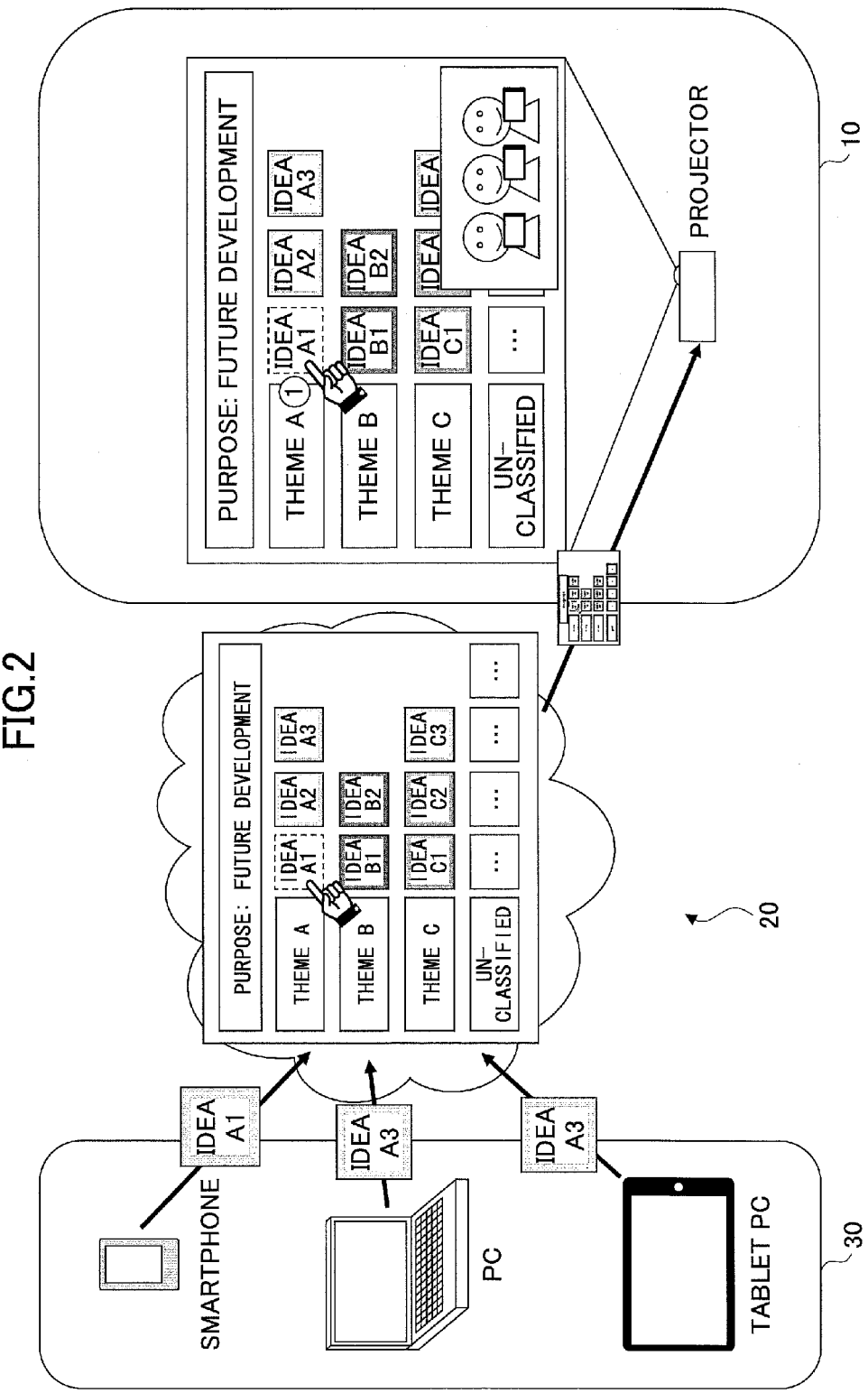
FIG. 2 is an example conceptual drawing illustrating the information processing system according to the first embodiment.

FIG. 2 is a drawing illustrating one concept of the information processing system 1 according to the first embodiment. In the example shown in FIG. 2, it is assumed that the K-J method is electronically performed using the information processing system 1.

The information processing apparatus 30 shown in FIG. 2 may be, for example, a personal computer (PC), a tablet terminal, a smartphone or the like, so that data written (input) by hand to the information processing apparatus 30 are displayed on the display part of information processing apparatus 30 as if the data were written on a sticky note.

The information processing apparatus 30 generates the data written by hand or the input data as sticky note data, and transmits image data (e.g., information in a bit-map format) of the sticky note data to the server 20. The server 20 determines the layout position of the sticky note data, and generates the display screen information of a display screen ("shared view") including the sticky note data. The server 20 transmits the generated display screen information to the projection apparatus 10.

The projection apparatus 10 projects a display screen including various data transmitted from the server 20 on a projection surface.

After that, when detecting a color change or a data movement of the data included in the display screen, the server 20 stores the log of the change or store the change (movement) of the data in the display screen as video data.

Figure 3:
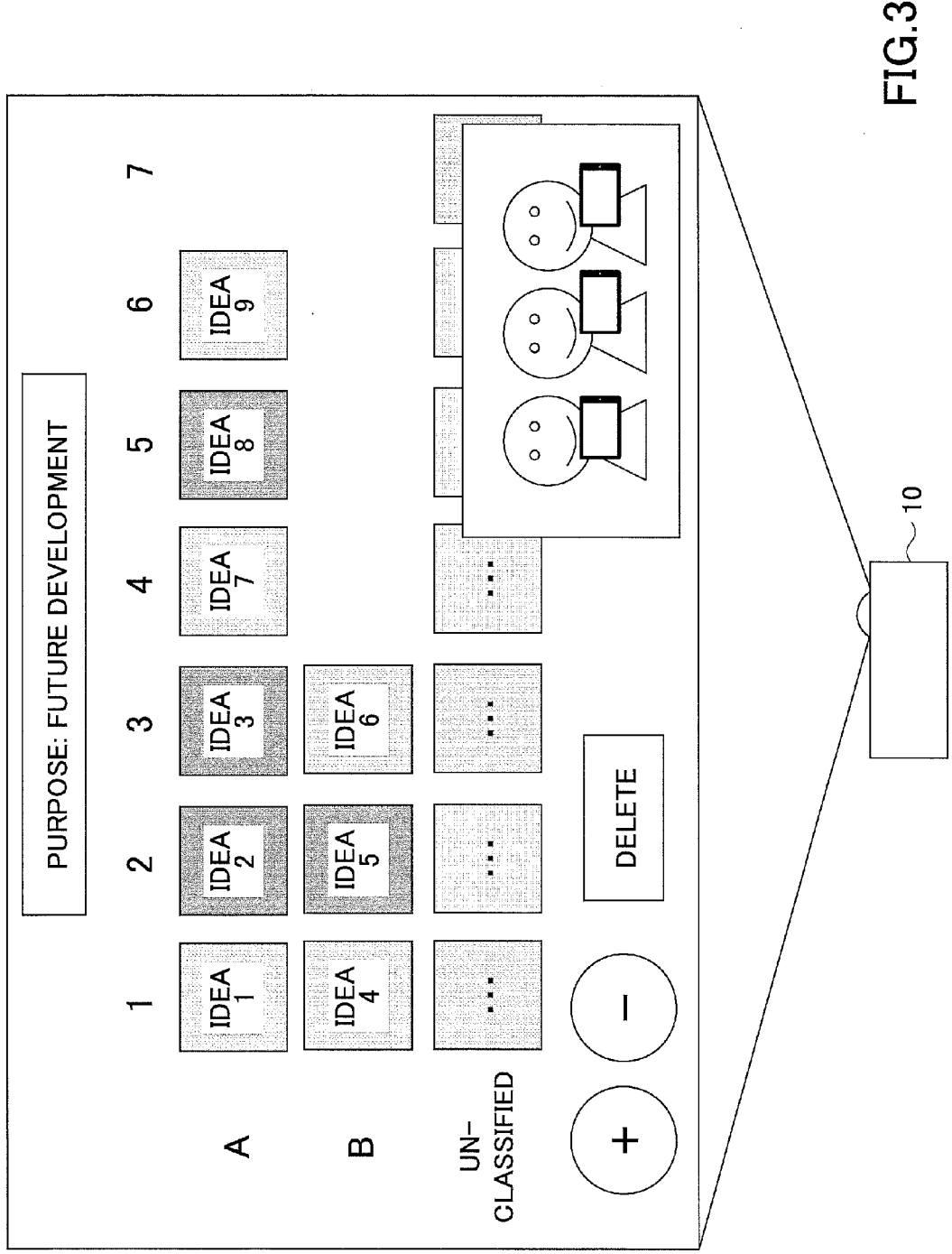
FIG. 3 is a drawing illustrating an example display screen projected by a projection apparatus.

FIG. 3 shows an example of the display screen projected by the projection apparatus 10. As shown in FIG. 3, the display screen includes various sticky note data transmitted from information processing apparatuses 30. The sticky note data may be moved by, for example, touch sensing described below.

Further, the image of FIG. 3 may be displayed on the display part of the information processing apparatus 30. To that end, the server 20 may transmit the display screen information to the information processing apparatus 30.

Configuration

Figure 4:
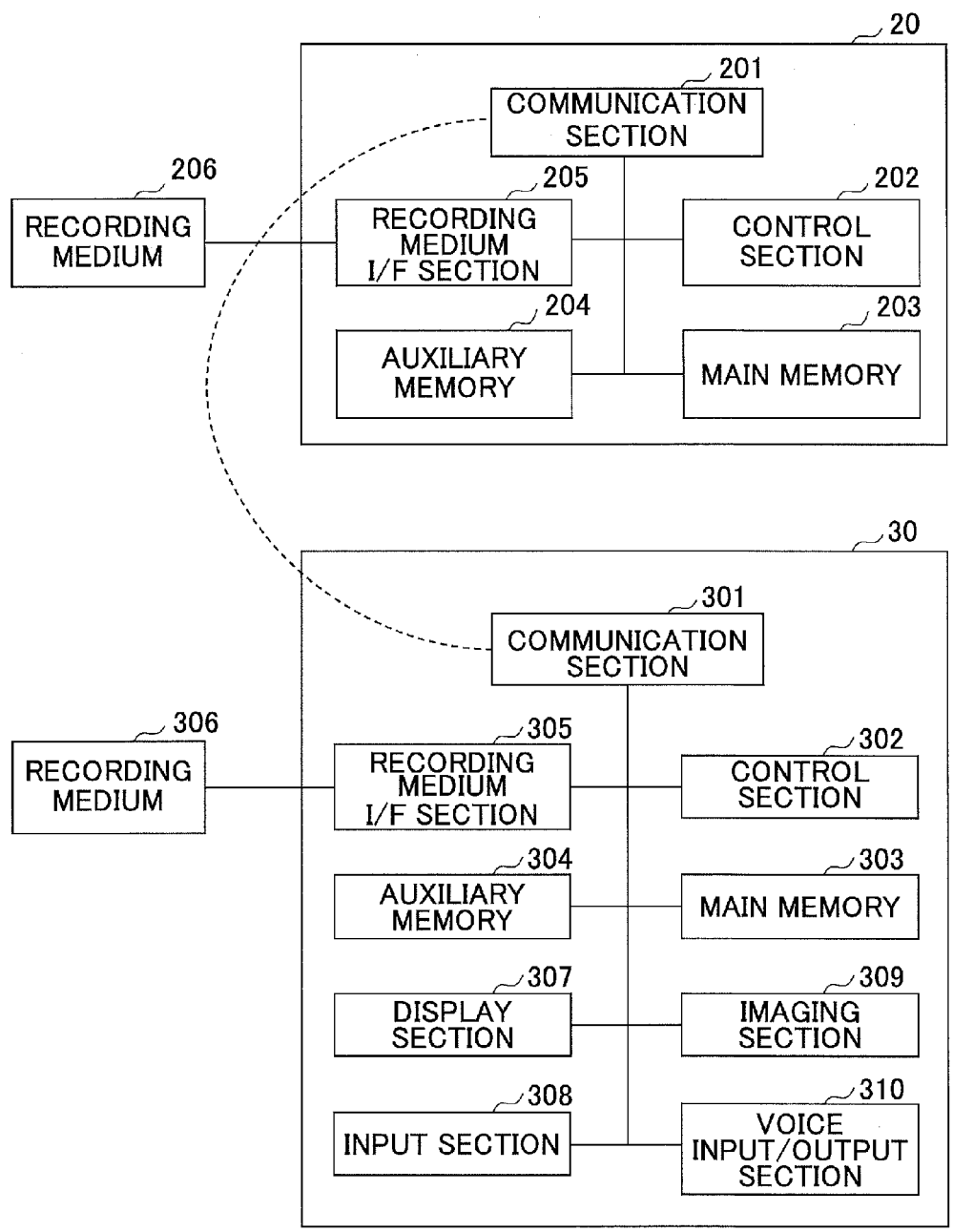
FIG. 4 is a block diagram of an example of functions of a server and an information processing apparatus according to the first embodiment.

FIG. 4 is a block diagram of an example configuration of the server 20 and the information processing apparatus 30 according to the first embodiment. As shown in FIG. 4, the server 20 includes a communication section 201, a control section 202, a main memory 203, an auxiliary memory 204, and a recording medium I/F section 205. Those functions (elements) are connected to each other via a bus so as to transmit and receive data with each other.

The communication section 201 is an interface between the server 20 and a peripheral apparatus connected to the server via a network such as a LAN or WAN having its communication function and data transmission paths to transmit data wirelessly or using cables.

The control section 202 is a central processing unit (CPU) in a computer that performs controls on various apparatuses, data calculation, and data processing. Further, the control section 202 is an arithmetic device that executes a K-J method control program stored in the main memory 203 or the auxiliary memory 204, so as to receive data from the memory or the like, performs the data calculation and the data processing, and outputs the results to the memory.

The main memory 203 is a Read-Only Memory (ROM), a Random Access Memory (RAM) or the like that stores and temporarily stores programs of an OS which is an operating system (basic software) and application software and the like to be executed by the control section 202.

The auxiliary memory 204 is a storage apparatus such as a Hard Disk Drive (HDD) or the like, and stores data related to application software.

The recording medium I/F section 205 reads a program from a recording medium 206 such as an SD card, and installs the read program into memory. Further, for example, the K-J method control program is installed in the recording medium 206, so that the K-J method control program is installed in the server 20 via the recording medium I/F section 205. The K-J method control program installed in the server 20 can be executed by the server 20.

Further, as shown in FIG. 4, the information processing apparatus 30 includes a communication section 301, a control section 302, a main memory 303, an auxiliary memory 304, a recording medium I/F section 305, a display section 307, an input section 308, an imaging section 309, and a voice input/output section 310. Those functions (elements) are connected to each other via a bus so as to transmit and receive data with each other.

The communication section 301 is an interface between the information processing apparatus 30 and a peripheral apparatus connected to the apparatus via a network such as a LAN or WAN having its communication function and data transmission paths to transmit data wirelessly or using cables.

The control section 302 is a central processing unit (CPU) in the computer that performs controls on various apparatuses, data calculation, and data processing. Further, the control section 302 is an arithmetic device that executes the K-J method control program stored in the main memory 303 or the auxiliary memory 304, so as to receive data from the memory or the like, performs the data calculation and the data processing, and outputs the results to the memory.

The main memory 303 is a Read-Only Memory (ROM), a Random Access Memory (RAM) or the like that stores and temporarily stores programs of an OS which is an operating system (basic software) and application software and the like to be executed by the control section 302.

The auxiliary memory 304 is a storage apparatus such as a Hard Disk Drive (HDD) or the like, and stores data related to application software.

The recording medium I/F section 305 reads a program from a recording medium 206 such as an SD card, and installs the read program into memory. Further, for example, the K-J method control program is installed in the recording medium 306, so that the K-J method control program is installed in the information processing apparatus 30 via the recording medium I/F section 305. The K-J method control program installed in the information processing apparatus 30 can be executed by the information processing apparatus 30.

The display section 307 includes a Liquid Crystal Display (LCD), an organic electroluminescence (EL) display or the like and displays in accordance with the input data from the control section 302. Further, the display section 307 may be separated from the information processing apparatus 30. In this case, the information processing apparatus 30 includes a display control section to control the display section.

The input section 308 includes a keyboard and a mouse, slide pad or the like. The keyboard includes cursor keys, letter keys, ten keys, and various function keys. The mouse and the slide pad are used for, for example, selecting a key on the display screen of the display section 307. Further, the input section 308 may be a touch panel including the display section 307.

The imaging section 309 includes an imaging device such as a Charge Coupled Device (CCD) or a Complementary Metal Oxide Semiconductor (CMOS) Device to acquired an captured image.

The voice input/output section 310 includes a microphone and a speaker to input and output voice and sound.

Functions

Figure 5:
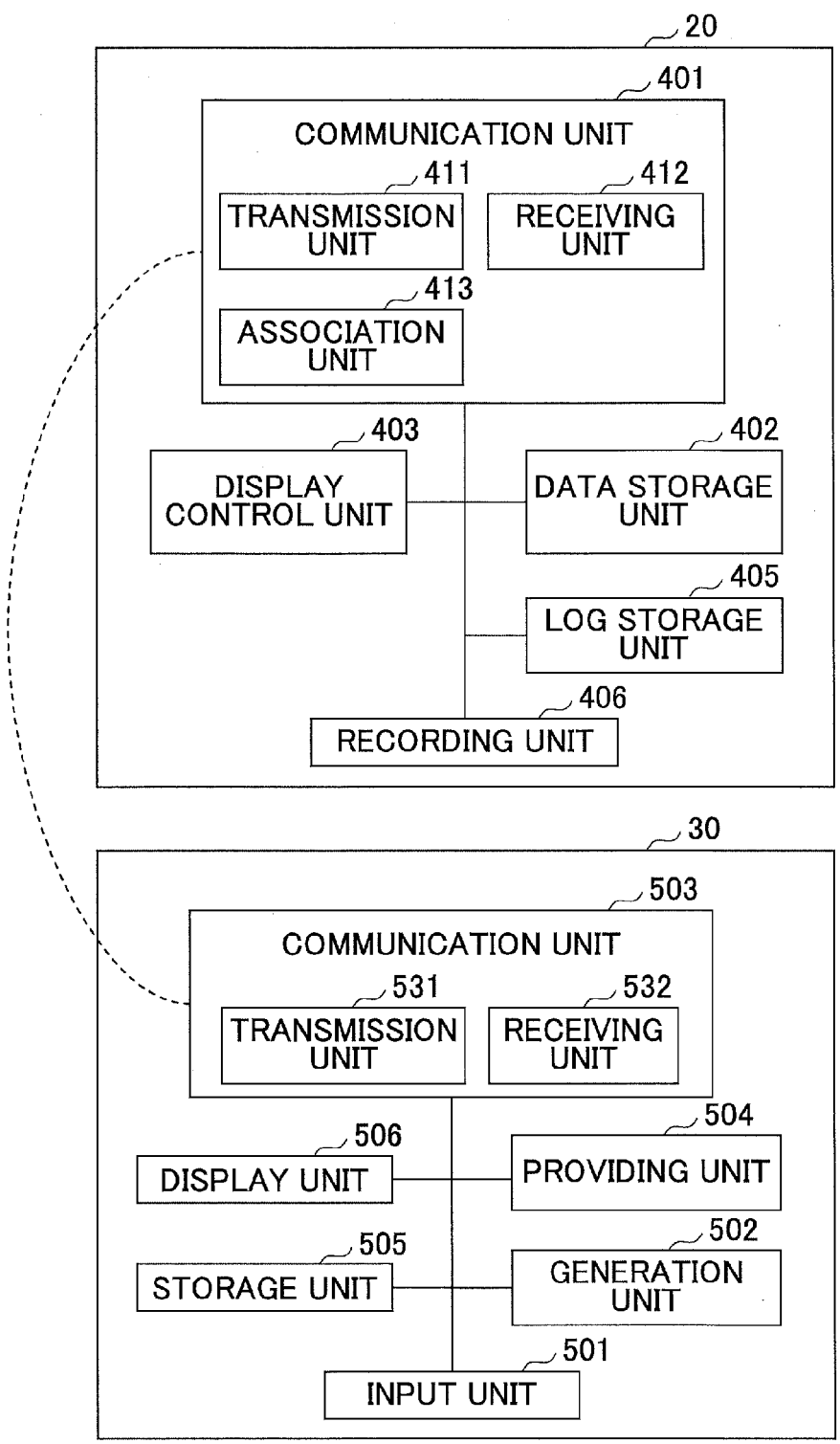
FIG. 5 is a block diagram of another example of the functions of the server and the information processing apparatus according to the first embodiment.

FIG. 5 is a block diagram of an example functions of the server 20 and the information processing apparatus 30 according to the first embodiment. First, the functions of the server 20 are described.

As shown in FIG. 5, the server (information processing apparatus) 20 includes a communication unit 401, a data storage unit 402, a display control unit 403, a log storage unit 405, and a recording unit 406. The communication unit 401 includes a transmission unit 411, a receiving unit 412, and an association unit 413.

The communication unit 401 may be realized by, for example, the communication section 201, the control section 202 and the like. The display control unit 403 and the recording unit 406 may be realized by, for example, the control section 202, the main memory 203 as a working memory, and the auxiliary memory 204 and the like. The data storage unit 402 and the log storage unit 405 may be realized by, for example, the main memory 203 and the auxiliary memory 204.

The transmission unit 411 transmits the display screen information (shared view information) generated by the display control unit 403 to the projection apparatus 10, the information processing apparatus 30 and the like.

Further, when the receiving unit 412 receives a request for acquiring video from an apparatus where the communication error is removed, the transmission unit 411 transmits the video captured from when a communication error occurred for the apparatus until when the communication error is removed along with the relevant logs to the apparatus. The communication error includes a communication interruption and a communication delay.

The receiving unit 412 receives various data input to one or more information processing apparatuses 30. The received data may be, for example, the sticky note data. Further, the receiving unit 412 receives a request for acquiring video and voice data from the information processing apparatus 30.

The association unit 413 monitors a communication state with the one or more information processing apparatuses 30, and associates the information indicating the apparatus where the communication error occurs or the apparatus recovered from the communication error and the timing when the communication error occurs or the communication is recovered with the log to be stored in the log storage unit 405.

The data storage unit 402 stores the various data (data positional information) whose display positions are set (determined) in the display screen. The data storage unit 402 stores the positions, sizes, image data of the various data as the data positional information.

The display control unit 403 places the image data of the various data on the display screen based on the data positional information stored in the data storage unit 402, and generates the display screen information. Further, when one of the various data are changed due to instructions from the information processing apparatus 30 and the projection apparatus 10, the display control unit 403 updates the display screen in accordance with the change.

The log storage unit 405 stores the change of the data displayed on the display screen as the log. The log storage unit 405 stores the changed contents as the log whenever a new display screen is generated. The change of the data includes, for example, the movement of the data position and a color change of the data. Further, the log storage unit 405 may store the log using the displayed time in the video described below as the time when the change of the data occurs.

The recording unit 406 records the change of the data as video, the data being displayed in the display screen from when the communication error occurs to when the communication is recovered. The recording unit 406 may record the transition of the display screen as video by continuously recording the display screen in a time sequence along with the information identifying the information processing apparatus 30 where the communication error is occurring.

Further, when the voice data (voice) are acquired from the information processing apparatus 30 and the like, the recording unit 406 may record the video in association with the voice by synchronizing the video with the voice.

Next, the functions of the information processing apparatus 30 are described. As shown in FIG. 5, the information processing apparatus 30 includes an input unit 501, a generation unit 502, a communication unit 503, a providing unit 504, a storage unit 505, and a display unit 506. The communication unit 503 includes a transmission unit 531 and a receiving unit 532.

The input unit 501 may be realized by, for example, the input section 308. The display unit 506 may be realized by, for example, the display section 307. The communication unit 503 may be realized by, for example, the communication section 301, the control section 302 and the like.

The storage unit 505 may be realized by, for example, the main memory 303 and the auxiliary memory 304 and the like. The generation unit 502 may be realized by, for example, the control section 302 and the main memory 303 serving as the working memory.

The input unit 501 inputs data (hereinafter may be referred to as "input data") by hand writing on the touch panel or using the keyboard.

The generation unit 502 generates, for example, the sticky note data in the K-J method based on the input data. In this case, the sticky note data are generated as the image data including, for example, the data input by hand or the input data.

The transmission unit 531 of the communication unit 503 transmits the sticky note data generated by the generation unit 502 to the server 20 via a network.

The receiving unit 532 receives the log, video, and voice of the display video from the server 20. The data from the server 20 are output to the providing unit 504.

The providing unit 504 outputs the frames (frame-by-frame playback) of the display screen based on the acquired logs to the display unit 506, plays back the acquired video, and outputs the acquired voice. By doing this, the user can recognize a change of the display screen occurred on the server 20 side during the occurrence of a communication error. Details of the providing unit 504 are described below with reference to FIG. 6.

The storage unit 505 stores the data input by the input unit 501 during the occurrence of the communication error to the server 20. Further, the storage unit 505 may store the sticky note data generated based on the input data.

By doing this, after the communication is recovered, it becomes possible to transmit all the data stored in the storage unit 505 or the data selected by the user in accordance with the meeting contents while the communication error to the server 20 occurs.

The display unit 506 displays the frames (frame-by-frame playback) of the display screen acquired from the providing unit 504. Further, the display unit 506 may display the video acquired from the providing unit 504. Further, the display unit 506 may display the data input by the input unit 501.

Providing Unit

Figure 6:
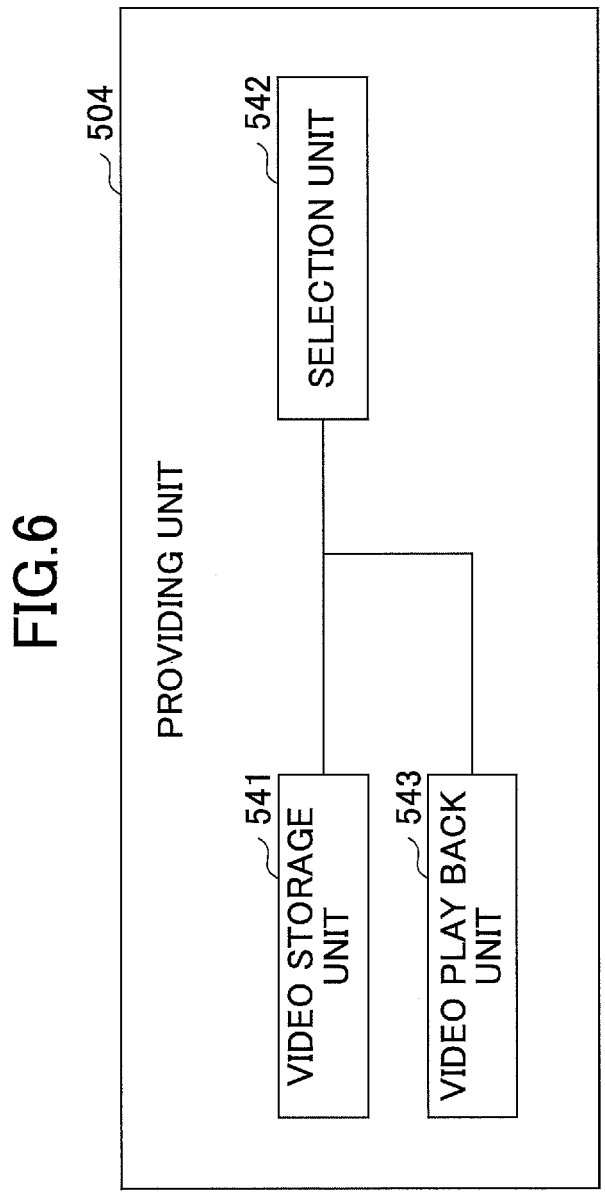
FIG. 6 is a block diagram of an example of functions of a providing unit according to the first embodiment.

FIG. 6 is a block diagram showing an example of the functions of the providing unit 504 according to the first embodiment. As shown in FIG. 6, the providing unit 504 includes a video storage unit 541, a selection unit 542, and a video play back unit 543.

The video storage unit 541 stores the video, the log and the like acquired from the server 20. The selection unit 542 switches the screen displayed on the display unit 506. For example, the selection unit 542 switches from an input screen to a playback screen of the display screen of the idea generation meeting.

The video play back unit 543 plays back the video stored in the video storage unit 541, performs the frame-by-frame playback on only the scenes that have been changed based on the logs. Due to the play back of the video based on the logs, a fast-feed frame-by-frame playback can be performed only on the scenes that have been changed.

By doing this, even when the communication error occurs, the information processing system 1 may provide the information to assist a user (participant) to smoothly rejoin (catch up) the meeting. Therefore, in the information processing system 1, the thoughts of the participant may not be interrupted.

Namely, it is not necessary to temporarily stop the meeting until the communication error is removed without interrupting the thoughts of the participants. Therefore, the meeting time may not be wasted.

Operational Outline of Information Processing Apparatus

Figure 7:
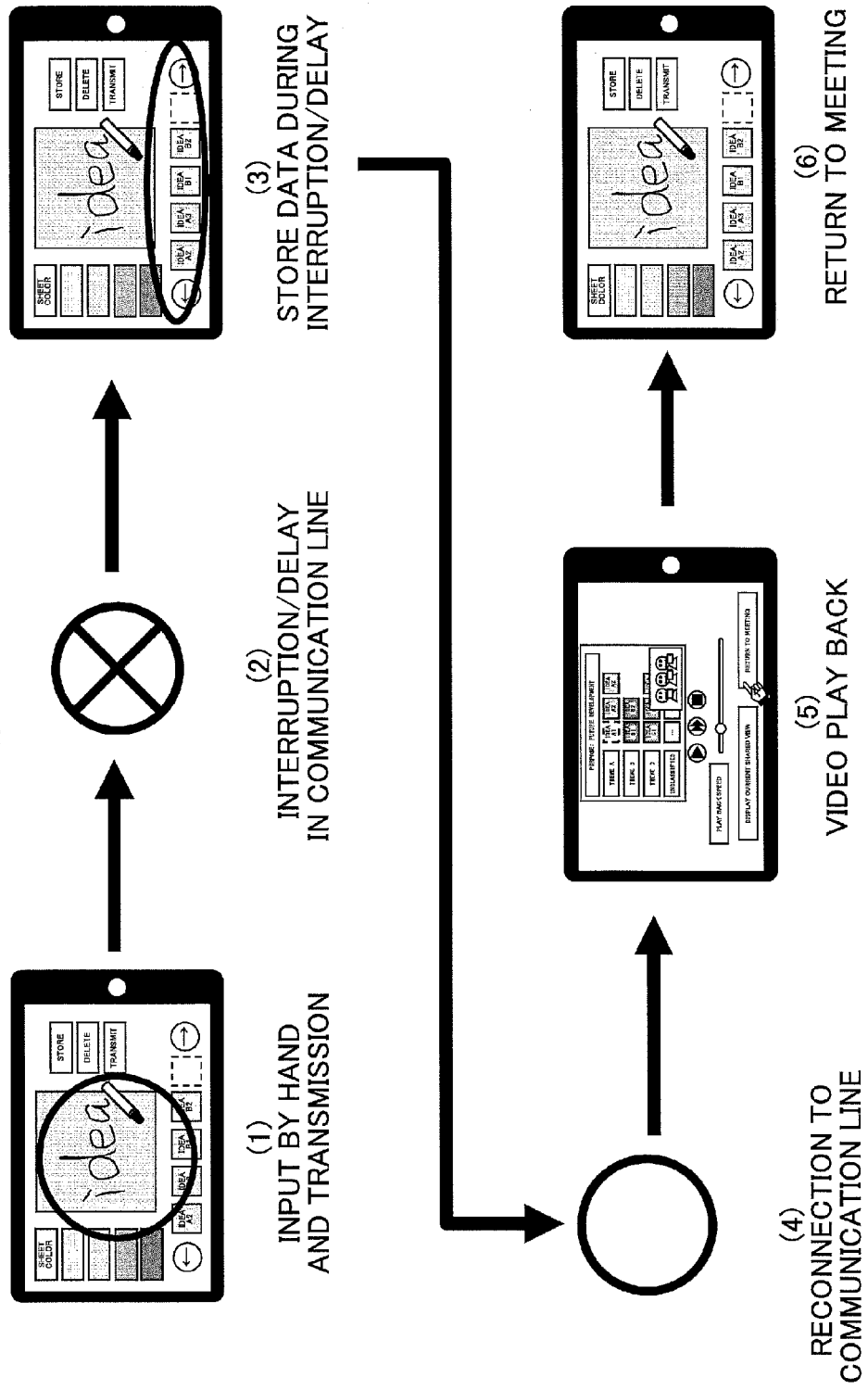
FIG. 7 is a drawing illustrating an example of an outline of operations of the information processing apparatus according to the first embodiment.

Next, an operational outline of the information processing apparatus 30 is described. FIG. 7 shows an example of the operational outline of the information processing apparatus 30. In the example of FIG. 7, it is assumed that a tablet terminal is used as the information processing apparatus 30.

(1): First, in the information processing apparatus 30, the data are input by hand or the like, so that the sticky note data are generated and transmitted to the server 20.

(2): Here, it is assumed that a communication error (e.g., the communication interruption or the communication delay) occurs between the information processing apparatus 30 and the sever 20.

(3): During the communication error, the information processing apparatus 30 stores the data, which are input by the input unit 501, into the storage unit 505.

(4): Next, it is assumed that the communication error between the information processing apparatus 30 and the server 20 is removed, so that the information processing apparatus 30 and the server 20 can communicate with each other.

(5): The information processing apparatus 30 acquires the logs and video of the display screen, so as to play back the video showing the changes of the display screen during the communication error.

(6): The information processing apparatus 30 switches to (displays) the input screen and allows the user to return to the meeting.

By doing this, even if a communication error occurs between the information processing apparatus 30 and the server 20, the user may smoothly rejoin the meeting and follow up the discussion contents of the meeting.

Processes

Next, the processes are described that are performed while an idea generation meeting based on the K-J method in the information processing apparatus 1.

Sticky Note Generation Process

Figures 8, 9:
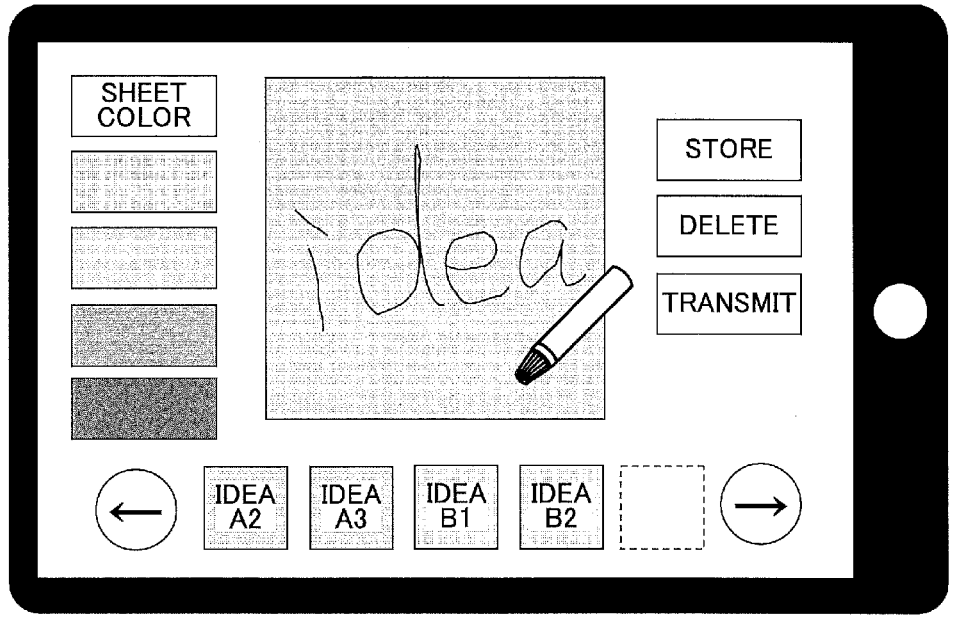
FIG. 8 is a drawing illustrating an example input screen of the information processing apparatus.
FIG. 9 is a drawing illustrating an example of data positional information.

First, a sticky note generation process is described. FIG. 8 shows an example of an input screen of the information processing apparatus 30. In this example, a user may write characters using an electronic pen in the center part of the information processing apparatus 30 of FIG. 8.

On the right-hand side of the screen, there are operational buttons. By using the operational buttons, the user may transmit the image data of the characters input by hand, delete the characters input by hand, and store the input characters. Further, the user may select a color of the sticky note by selecting one of the color patch (sheet color) buttons on the left-hand side of the screen.

Before using the information processing system 1, the information processing terminal establishes a communication with the server 20. In the information processing apparatus 30, characters and figures are written (drawn) on the touch panel and are stored in the terminal as an image data.

When the user presses the "Transmit" button provided on the display part of the information processing apparatus 30, the information processing apparatus 30 transmits the image data (sticky note data) of the data, which are written by hand and are displayed on the display part, to the server 20.

Upon receiving the image data from the information processing apparatus 30, the server 20 generates the data positional information based on the image data. The server 20 attaches (applies) a predetermined initial position and magnification factor to the sticky note data. For example, as shown in the example of FIG. 3, the server 20 places the newly acquired sticky note data in the "unclassified" position.

Here, the "data positional information" refers to the information including the image data, the position, the size, the magnification factor, the category and the like of the image data.

Sticky Note Display Process

Next, a sticky note display process is described. Here, the sticky note is treated as the digital data. Further, the data positional information includes the following data.

Left-upper coordinate (x,y)
Magnification factor (a)
Width and height of image (w, h)
Image data (i)

FIG. 9 shows an example of the data positional information. As shown in FIG. 9, the data of the "left-upper coordinate", "magnification factor", "width and height of image", and the "image data" are associated with each other. Further, as shown in FIG. 3, when the display screen includes classification, the data positional information further includes the data of "category", which is in association with the above data, to determine which category the sticky note data belongs to. In the example of FIG. 1, the category of the sticky note data is determined based on the position of the "y" coordinate.

The display control unit 403 generates a raster image that is to be projected (or displayed) by the projection apparatus 10 and the information processing apparatus 30, and transmits the display screen information of the raster image to the projection apparatus 10. The projection apparatus displays by projecting the raster image. The generation of the raster image is described.

First, the display control unit 403 generates a "blank image" (i.e., nothing is drawn (described) in the image) having the maximum number of pixels to be projected by the projection apparatus 10 or the information processing apparatus 30. This blank image is herein called a "canvas image".

The display control unit 403 acquires one sticky note data from the data positional information. The display control unit 403 generates an image by applying the magnification factor (a) to the image data (i) to generate a sticky note image.

The display control unit 403 places the sticky note image on the canvas image based on the left-upper coordinate (x,y). The display control unit 403 performs the process on all the sticky note date.

After placing all the sticky note date on the canvas image, the display control unit 403 transmits the updated display screen information to the projection apparatus 10. The projection apparatus 10 refreshes the display by replacing the projection image by the received canvas image. Here, the projection apparatus 10 may perform a part of the process of the display control unit 403.

Figure 10:
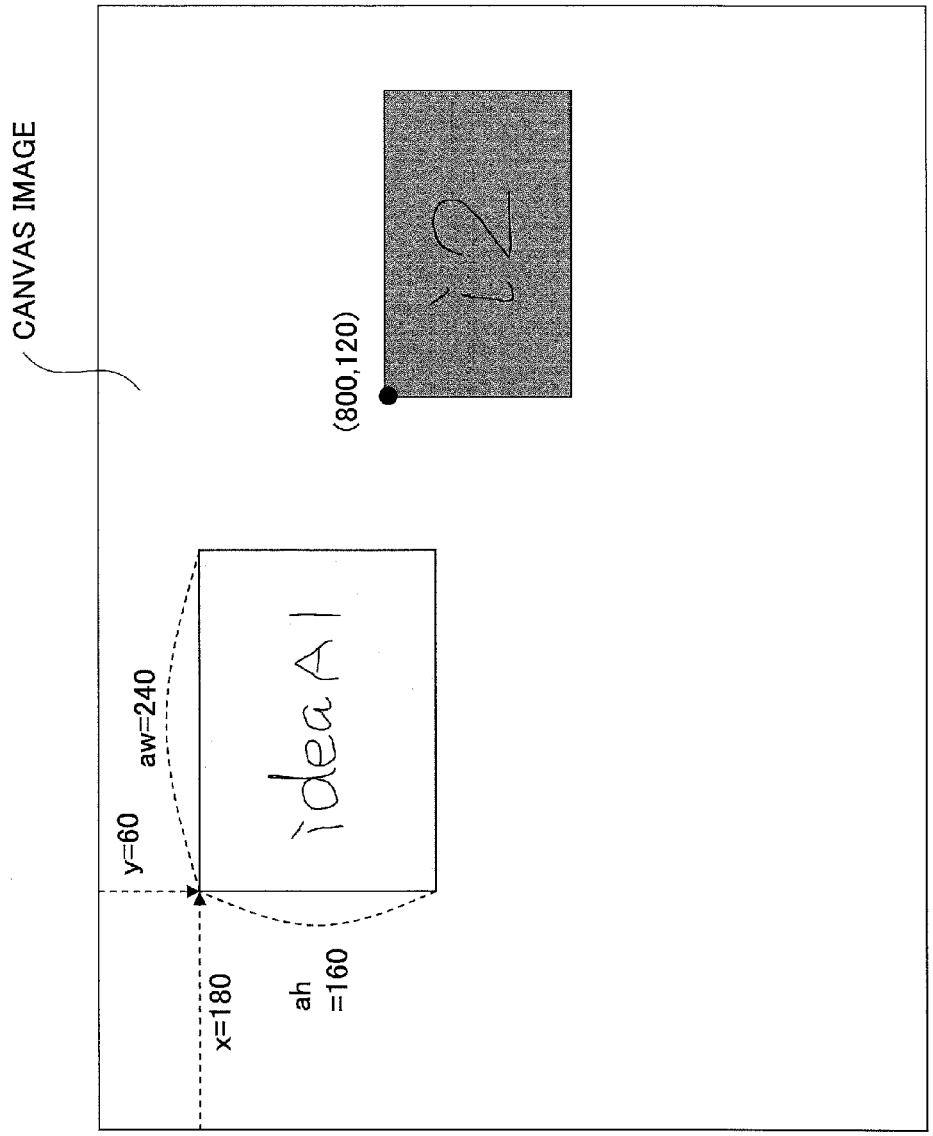
FIG. 10 is a drawing illustrating an example of a canvas screen.

FIG. 10 shows an example of the canvas image. The example of FIG. 10 shows the canvas image generated based on the data positional information of FIG. 9.

Log Storage Process

Figure 11:
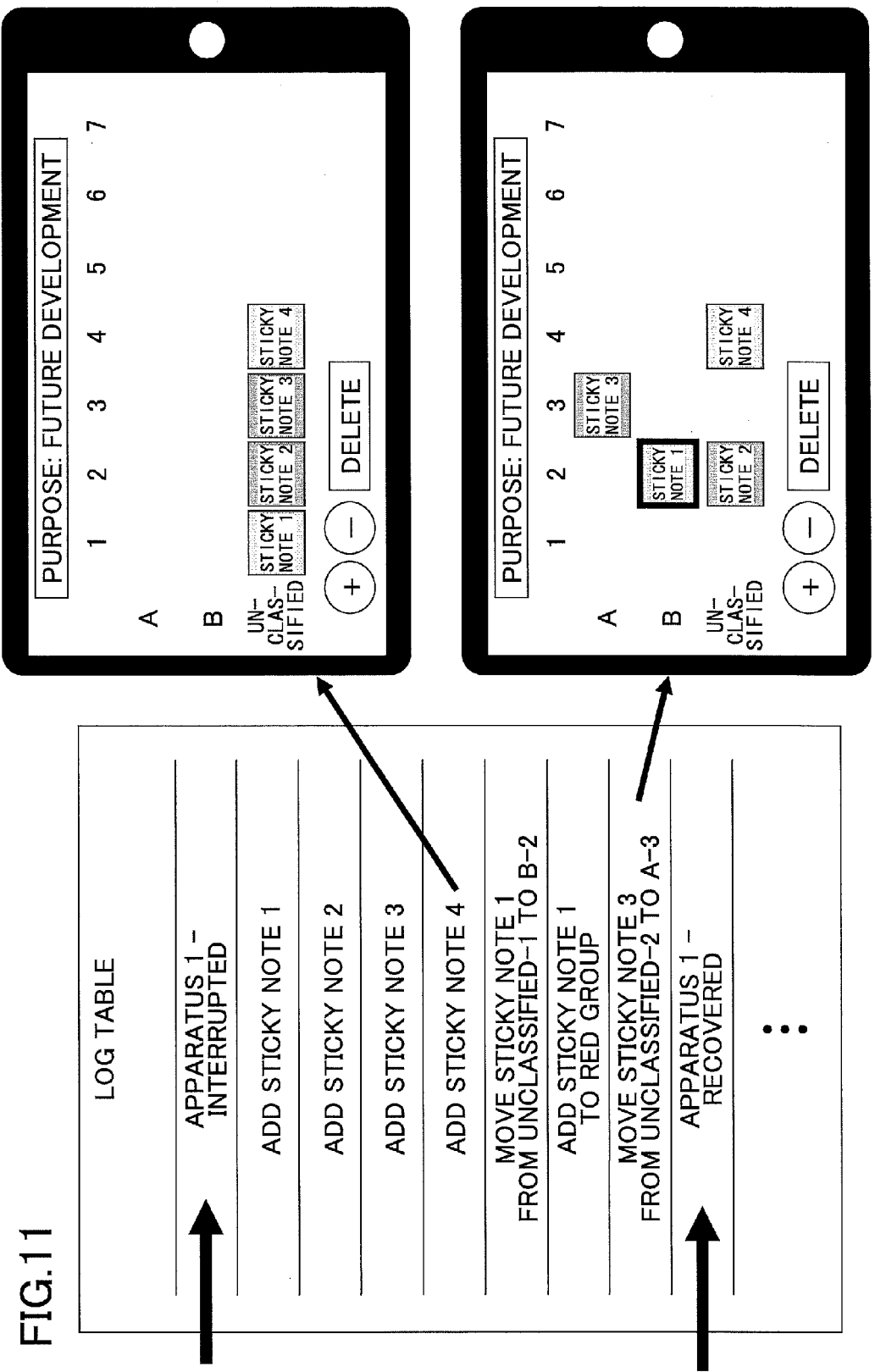
FIG. 11 is a drawing illustrating a log storing process.

Next, a log storage process is described. FIG. 11 illustrates the log storage process. As shown in FIG. 11, display control unit 403 stores the changed contents of the display screen are sequentially stored in a log table ("log information") stored in the log storage unit 405. Further, the association unit 413 stores the contents of the communication error or the communication recovery of the image processing apparatuses 30 in the log table.

As shown in the log table of FIG. 11, the sticky note 1 is added after the communication error (communication interruption) occurs in the communication related to the apparatus 1 (information indicating the apparatus). Further, various changes are detected until the communication of the apparatus 1 is recovered. Further, the log table may manage the changed contents in association with the time data using video time data.

By doing this, when the change of the display screen is stored using the video, it becomes possible to promptly determine the display screen at the time when the change is done.

Video Playback Process

Figure 12:
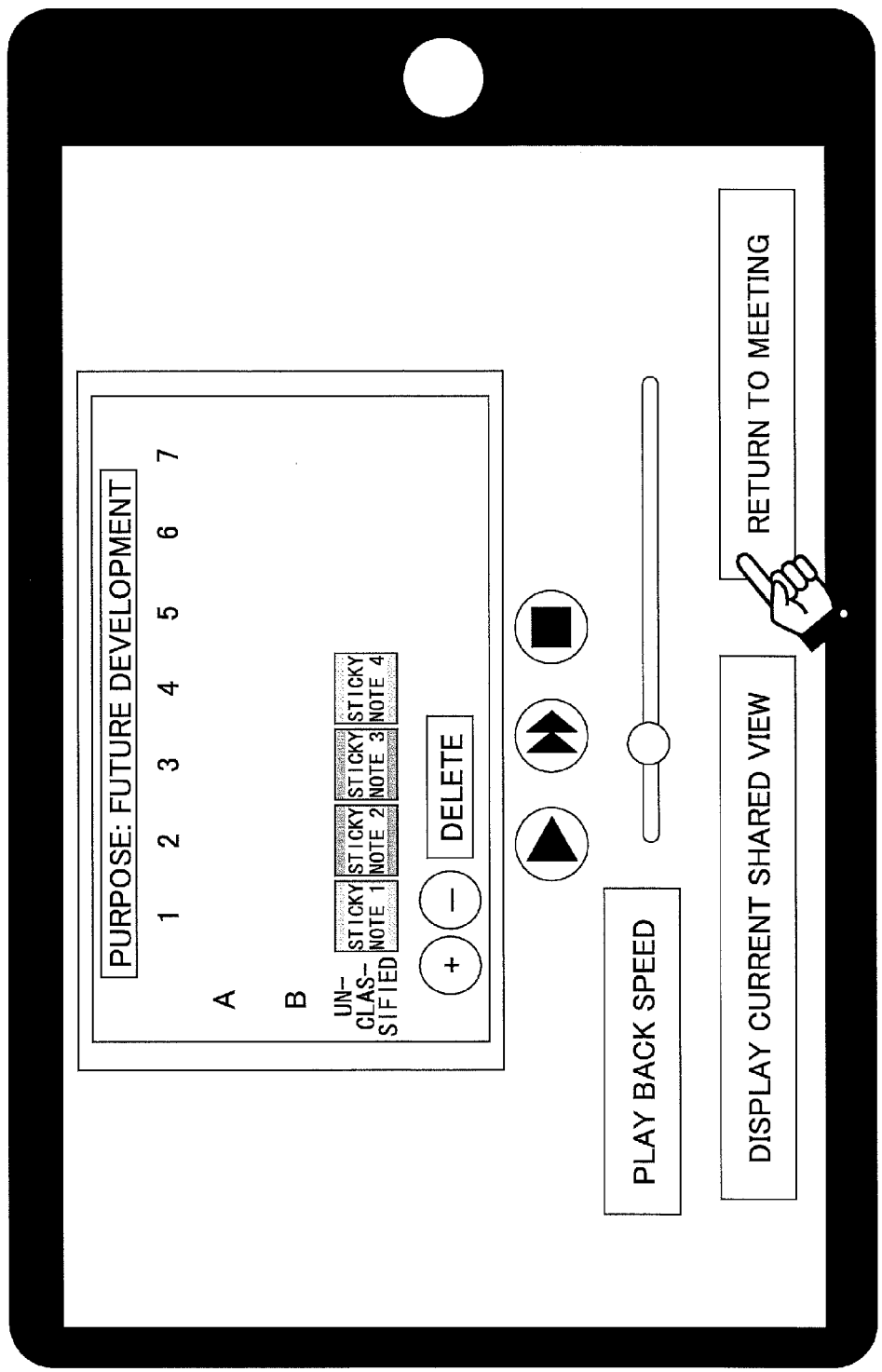
FIG. 12 is a drawing illustrating an example interface for video play back.

Next, a video playback process is described. FIG. 12 shows an example interface for video playback. In the interface of FIG. 12, when video is played back, it is possible to change the play back speed, view the current shared view, and return to the meeting.

Figure 13:
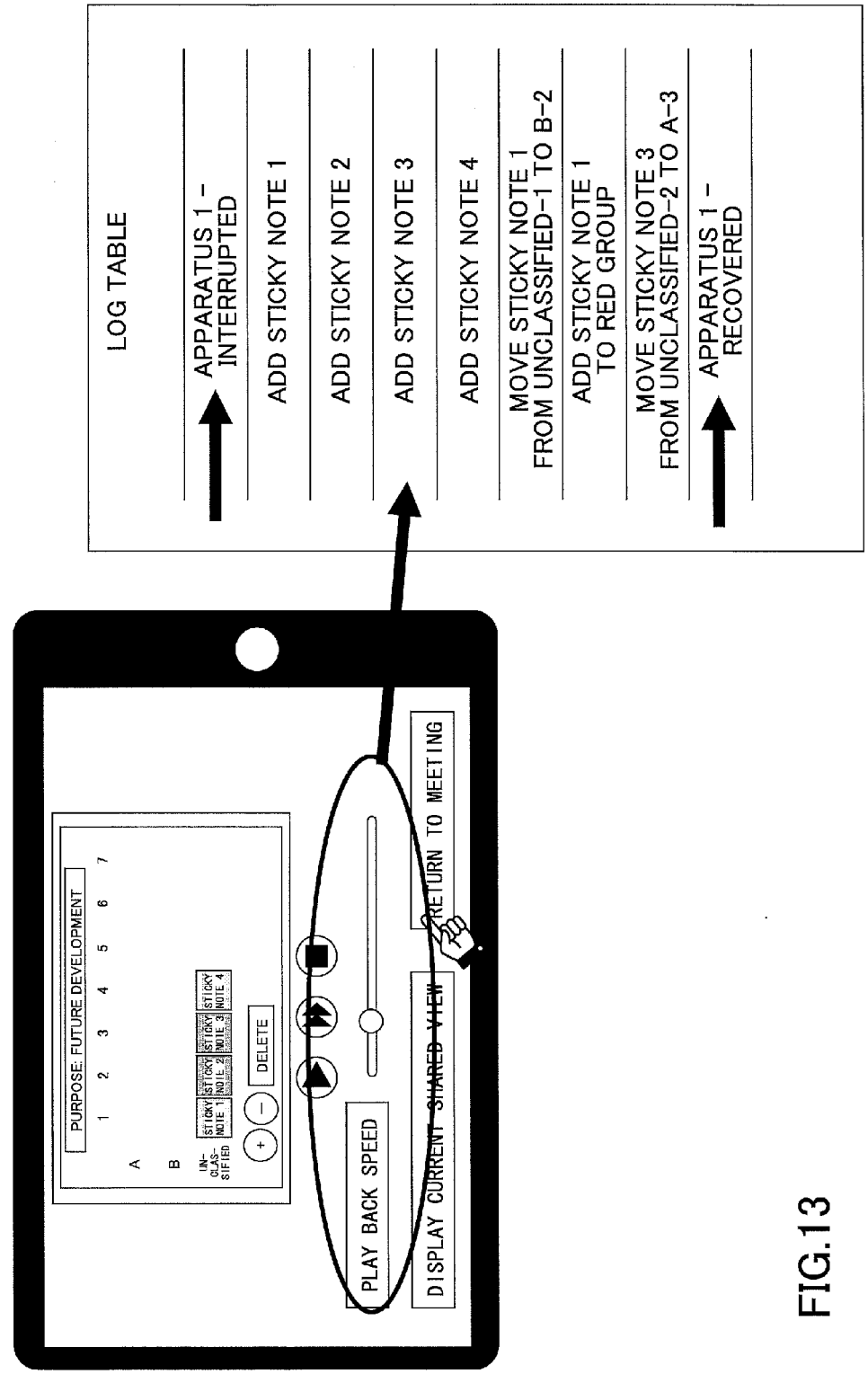
FIG. 13 is a drawing illustrating the video play back based on a log table.

FIG. 13 illustrates the video play back based on the log table. As shown in FIG. 13, the logs after the communication error occurs until the communication is recovered are transmitted to the information processing apparatus 30 indicating the apparatus 1.

In the example of FIG. 13, for example, by increasing the play back speed, small video around the event (i.e., contents change) in the log table may be played back fast-feed frame-by-frame. Further, in the example of FIG. 13, the small video around the event (i.e., contents change) in the log table may be played back fast-feed frame-by-frame when the button b11 is pressed.

In this case, if the voice data of the meeting in the change of the display screen are acquired, the voice input/output section 310 outputs the voice data corresponding to the event. By doing this, the user may understand the reason of the occurrence of the event based on the voice data.

Operations

Figure 14:
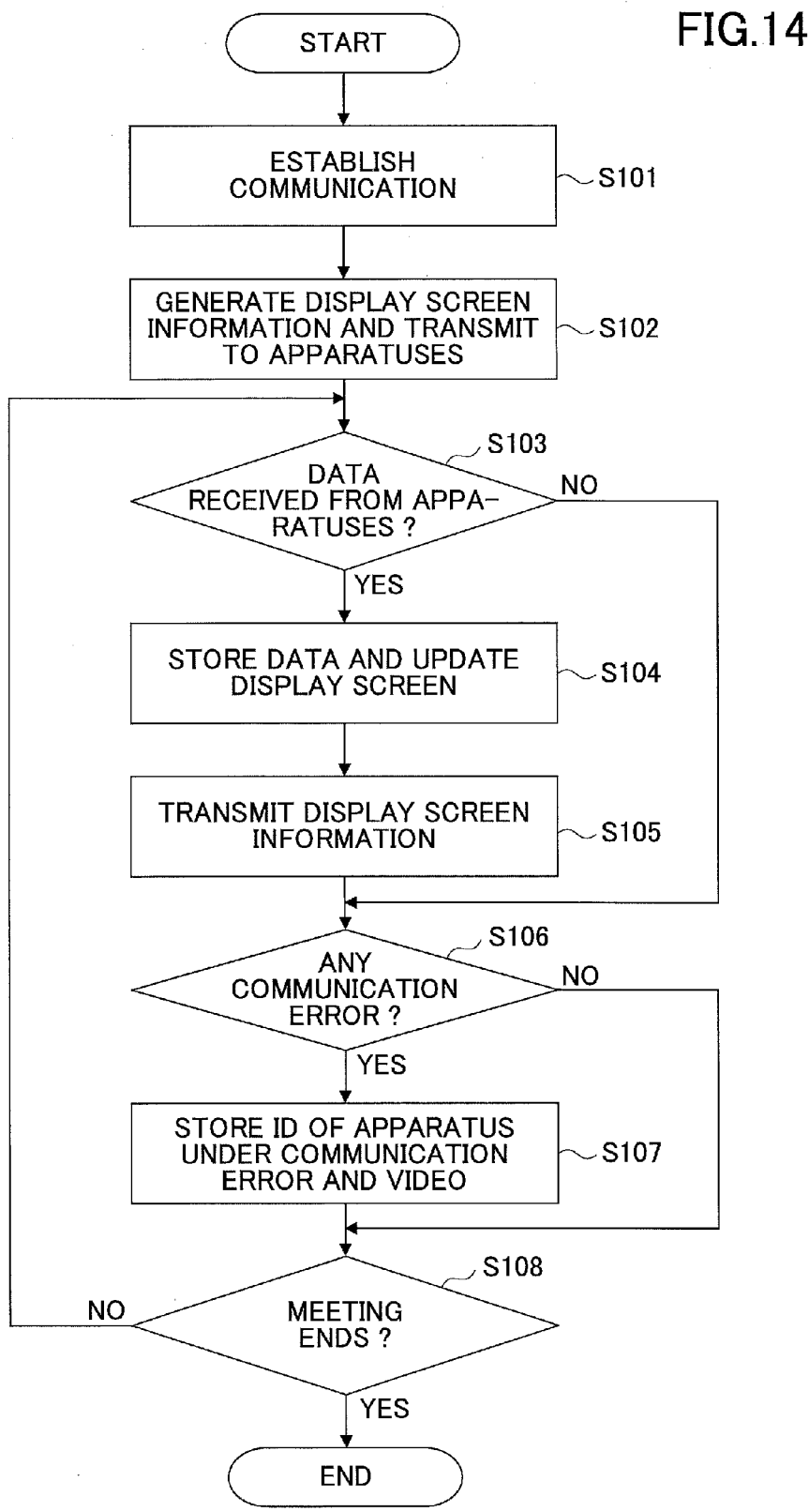
FIG. 14 is a flowchart illustrating an example process of the server according the first embodiment.

Next, the operations of the apparatuses in the information processing system 1 according to the first embodiment are described. FIG. 14 is a flowchart of an example process of the server 20 according to the first embodiment.

As shown in FIG. 14, in step S101, the communication unit 401 establishes a communication with the information processing apparatuses 30.

In step S102, the display control unit 403 generates the display screen information of the initial display screen, and transmits the generated display screen information to the projection apparatus 10 or the information processing apparatuses 30.

In step S103, the receiving unit 412 determines whether the data from the information processing apparatuses 30 are received. The data are, for example, the sticky note data. When it is determined that the data are received (YES in step S103), the process goes to step S104. Otherwise (NO in step S103), the process goes to step S106.

In step S104, the data storage unit 402 stores the received data, and the display control unit 403 updates the display screen based on the received data. In this case, the display control unit 403 stores the changed contents of the display screen in the log storage unit 405.

In step S105, the transmission unit 411 transmits the display screen information to the projection apparatus 10 or the information processing apparatuses 30.

In step S106, the association unit 413 determines whether the communication error occurs in the communications with the information processing apparatuses 30. When it is determined that the communication error occurs (YES in step S106), the process gores to step S107. Otherwise (NO in step S106), the process goes to step S108.

In step S107, the recording unit 406 records the information (ID) indicating the apparatus where the communication error occurs and the video including the data change of the display screen.

In step S108, the server 20 determines whether the meeting ends. The server 20 may determine that the meeting ends based on a meeting end notice from the information processing apparatus 30. When it is determined that the meeting ends (YES in step S108), the process ends. Otherwise (NO in step S108), the process goes back to step S103.

Based on the process described above, the server 20 may store the contents of the meeting along with the logs during the occurrence of the communication error for the apparatus where the communication error occurred.

Figure 15:
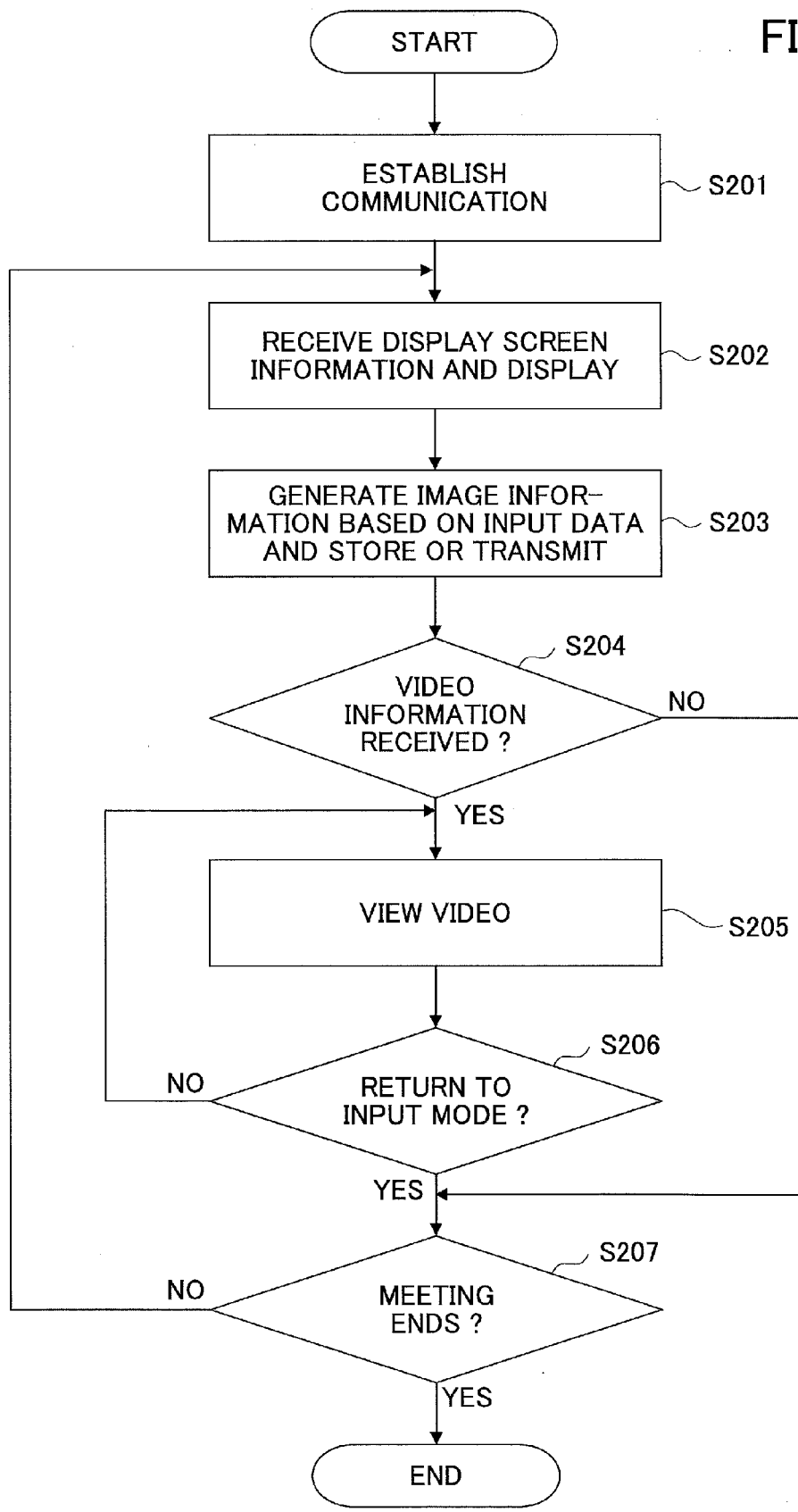
FIG. 15 is a flowchart illustrating an example process of the information processing apparatus according to the first embodiment.

Next, a process of the information processing apparatus 30 is described. FIG. 15 is a flowchart illustrating an example operation of the information processing apparatus according to the first embodiment.

As shown in FIG. 15, in step S201, the communication unit 503 establishes a communication with the server 20.

In step S202, the communication unit 503 receives the display screen information, and the display unit 506 displays the display screen information.

In step S203, the input unit 501 inputs the data, and the generation unit 502 generates the image data (sticky note data) based on the input data, so that the generated image data are stored or transmitted to the server 20.

In step S204, the communication unit 503 determines whether video information is transmitted from the server 20. When it is determined that the video information is transmitted (YES in step S204), the process goes to step S205. Otherwise (NO in step S204), the process goes to step S207.

In step S205, the providing unit 504 plays back the video on the display unit 506 to show the video to the user. In this case, the providing unit 504 may fast-feed frame-by-frame play back based on the logs.

In step S206, the selection unit 542 determines whether it is to be returned to data input mode. In this case, the selection unit 542 determines that it is to be returned to data input mode when the "return to meeting" button is pressed. When the "return to meeting" button is pressed (YES in step S206), the process goes to step S207. Otherwise (NO in step S206), the process goes back to step S205.

In step S207, the information processing apparatus 30 determines whether the meeting ends. The information processing apparatus 30 determines that the meeting ends when, for example, a "meeting end" button is pressed. When it is determined that the meeting ends (YES in step S207), the process ends. Otherwise (NO in step S207), the process goes back to step S202.

Based on the above operation, the information processing apparatus 30 may play back the part of the meeting that has not been seen due to the communication error.

Figure 16:
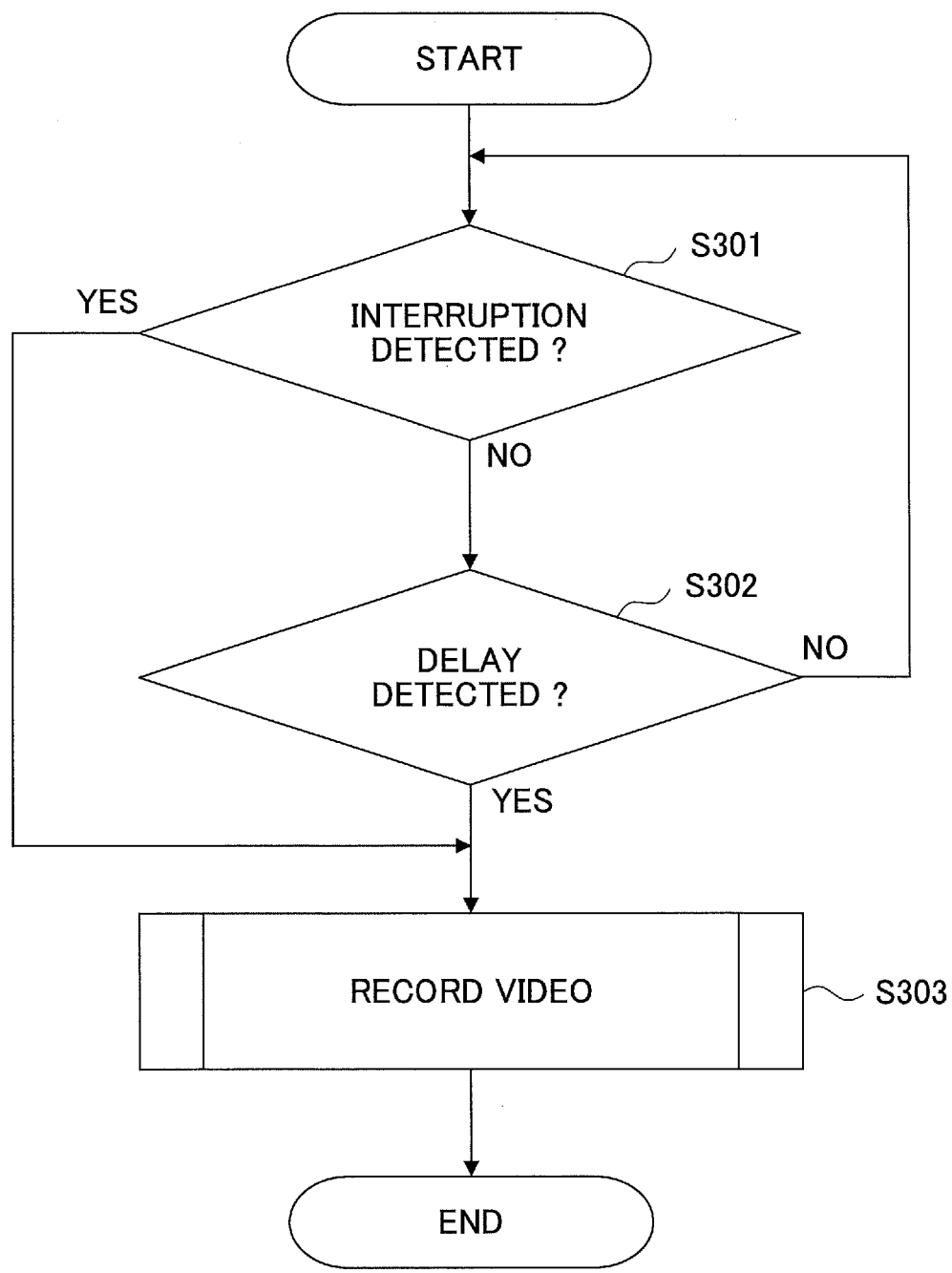
FIG. 16 is a flowchart illustrating an example video recording process according to the first embodiment.

Next, a video recording process is described. FIG. 16 is a flowchart of an example of the video recording process according to the first embodiment.

As shown in FIG. 16, in step S301, the association unit 413 determines whether the communication interruption is detected. When the communication interruption is detected (YES in step S301), the process goes to step S303. Otherwise (NO in step S301), the process goes to step S302.

In step S302, the association unit 413 determines whether the communication delay is detected. When the communication delay is detected (YES in step S302), the process goes to step S303. Otherwise (NO in step S302), the process goes back to step S301.

In step S303, the recording unit 406 records the video including the change of the display screen during the occurrence of the communication error. Details of the process in step S303 are described below with reference to FIG. 18.

Based on the above process, the state of the meeting (e.g., a state of the changes in the display screen) during the communication error may be recorded as the video.

Figure 17:
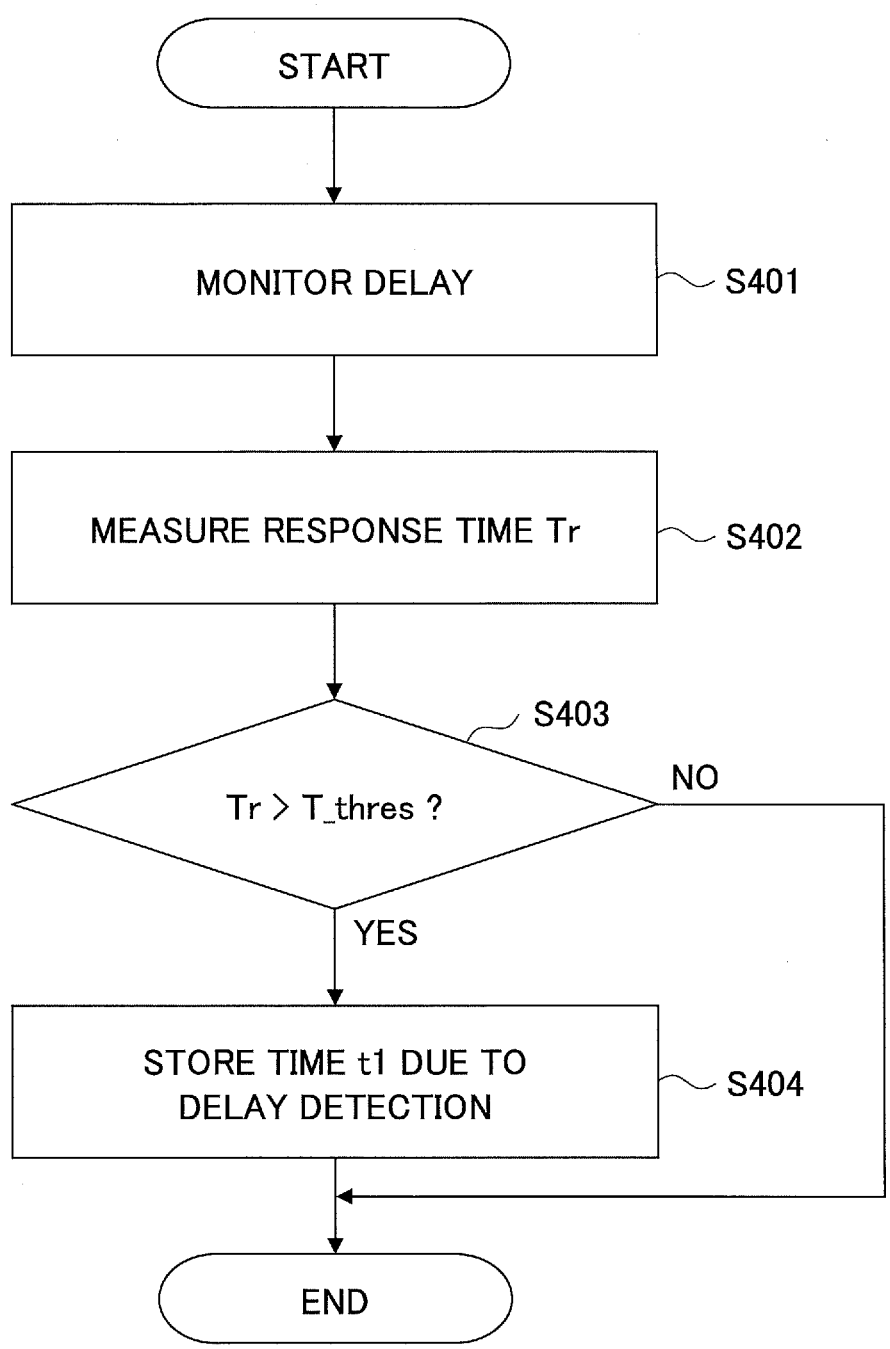
FIG. 17 is a flowchart illustrating an example process of detecting a communication delay according to the first embodiment.

Next, a process of detecting the communication delay is described. FIG. 17 is a flowchart of an example process to detect the communication delay according to the first embodiment.

As shown in FIG. 17, in step S401, the association unit 413 monitors the delay in the communications.

In step S402, the association unit 413 measures a response time "Tr". The association unit 413 may measure the response time "Tr" by, for example, using the "ping" command or the like.

In step S403, the association unit 413 determines whether the time "Tr" is greater than a threshold value "T_thres". In case of "Tr>T_thres" (YES in step S403), the process goes to step S404. In case of "Tr≤T_thres" (NO in step S403), the process ends.

In step S404, the association unit 413 detects the communication error, and stores the time "t1". By doing this, the communication delay may be detected.

Figure 18:
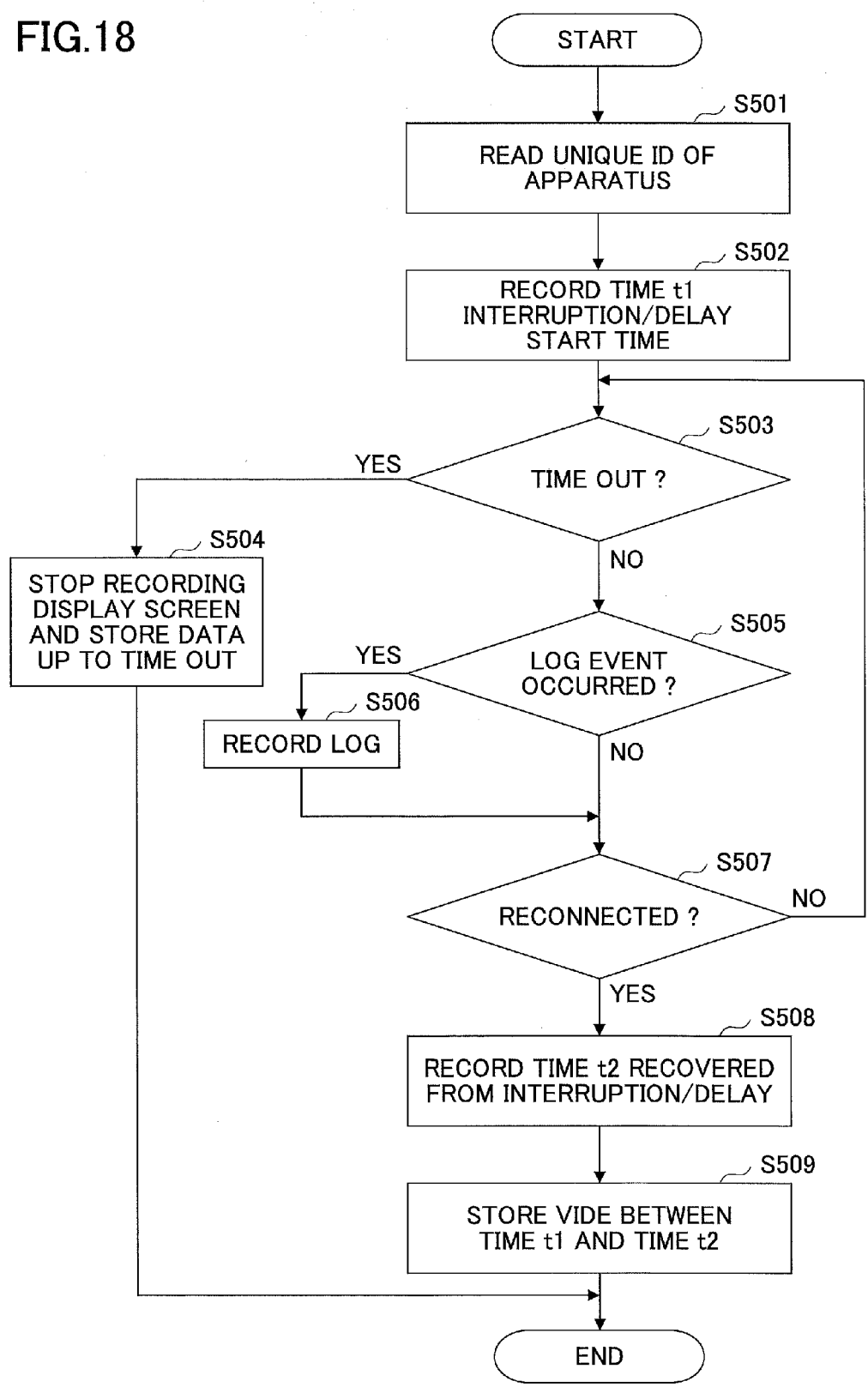
FIG. 18 is a flowchart illustrating an example detailed process of recording video according to the first embodiment.

Next, details of the video recording process are described. FIG. 18 is a flowchart of an example of the video recording process according to the first embodiment.

As shown in FIG. 18, in step S501, the unique ID of the apparatus where the communication error occurs is read.

In step S502, the recording unit 406 records the time "t1", which is the starting time of the communication error, in association with the unique ID.

In step S503, the recording unit 406 determines whether a time (communication) is timed out. When the time out is determined (YES in step S503), the process goes to step S504. When it is determined that the time is not timed out (NO in step S503), the process goes to step S505.

In step S504, the recording unit 406 stops recording the display screen and stores the video up until the time point of the time out.

In step S505, the display control unit 403 determines whether a log event occurs. When it is determined that the log event occurs (YES in step S505), the process goes to step S506. Otherwise (NO in step S505), the process goes to step S507.

In step S506, the log storage unit 405 stores the logs. In this case, the time may also be stored by using video displayed time.

In step S507, the communication unit 401 determines whether it is possible to re-connect to the apparatus where the communication error occurred. When determining that it is possible to re-connect to the apparatus (YES in step S507), the process goes to step S508. Otherwise, the process goes back to step S503.

In step S508, the recording unit 406 records the time "t2" indicating the recovery time from the communication error.

In step S509, the recording unit 406 stores the video from time "t1" to time "t2" in association with the unique ID.

By doing this, the video in association with the logs may be recorded.

Figure 19:
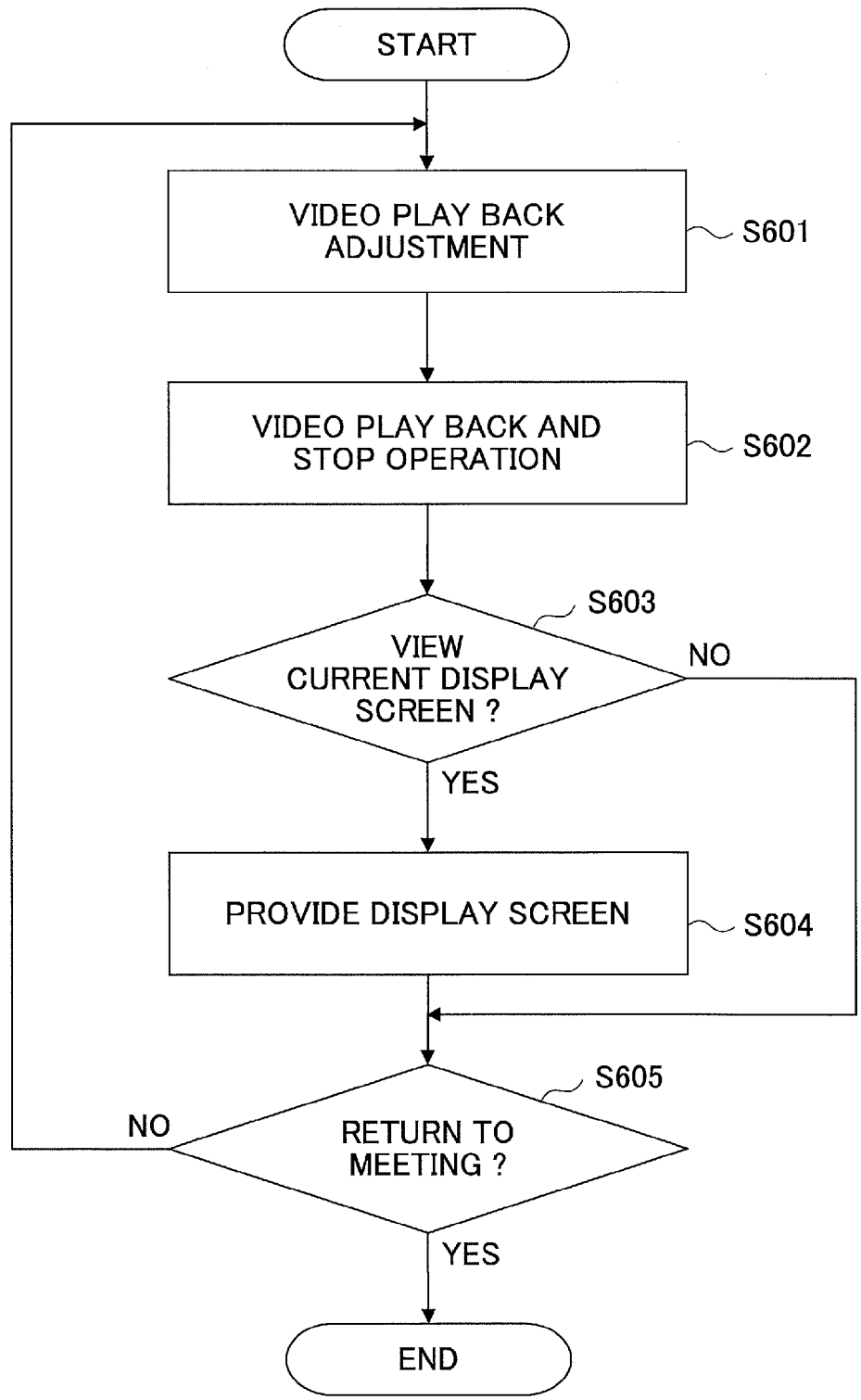
FIG. 19 is a flowchart illustrating an example display process of the information processing apparatus according to the first embodiment.

Next, a display process of the information processing apparatus is described. FIG. 19 is a flowchart of an example display process of the information processing apparatus according to the first embodiment of the present invention.

As shown in FIG. 19, in step S601, the providing unit 504 adjusts the video play back.

In step S602, the providing unit 504 performs processes of playing back (reproducing), stopping, and fast-feed frame-by-frame playing back on the video.

In step S603, the selection unit 542 determines whether the "display current shared view" button of FIG. 12 is pressed.

When the button is pressed (YES in step S603), the process goes to step S604. Otherwise (NO in step S603), the process goes to step S605.

In step S604, the display unit 506 displays the current display screen (shared view) based on the instructions from the selection unit 542.

In step S605, the selection unit 542 determines whether it is time to go back to the data input mode. The selection unit 542 determines whether it is time to go back to the data input mode when the "return to meeting" button is pressed. When the "return to meeting" button is pressed (YES in step S605), display is returned to the data input screen and the process ends. Otherwise (NO in step S605), the process goes back to step S601.

Based on the above process, the user may recognize (understand) the contents of the meeting during the communication error, and return to the input screen so as to input the user's ideas (thoughts) as if the communication error never occurred.

As described above, according to the first embodiment, it may become possible to conduct a computerized idea generation meeting where a user who was unable to participate a meeting due to a communication error can smoothly return to the meeting.

Modified Example

Next, a modified example of the information processing apparatus according to the first embodiment is described. In this modified example, the data in the projected or displayed display screen can be moved by using a touch detection on a large screen.

Figure 20:
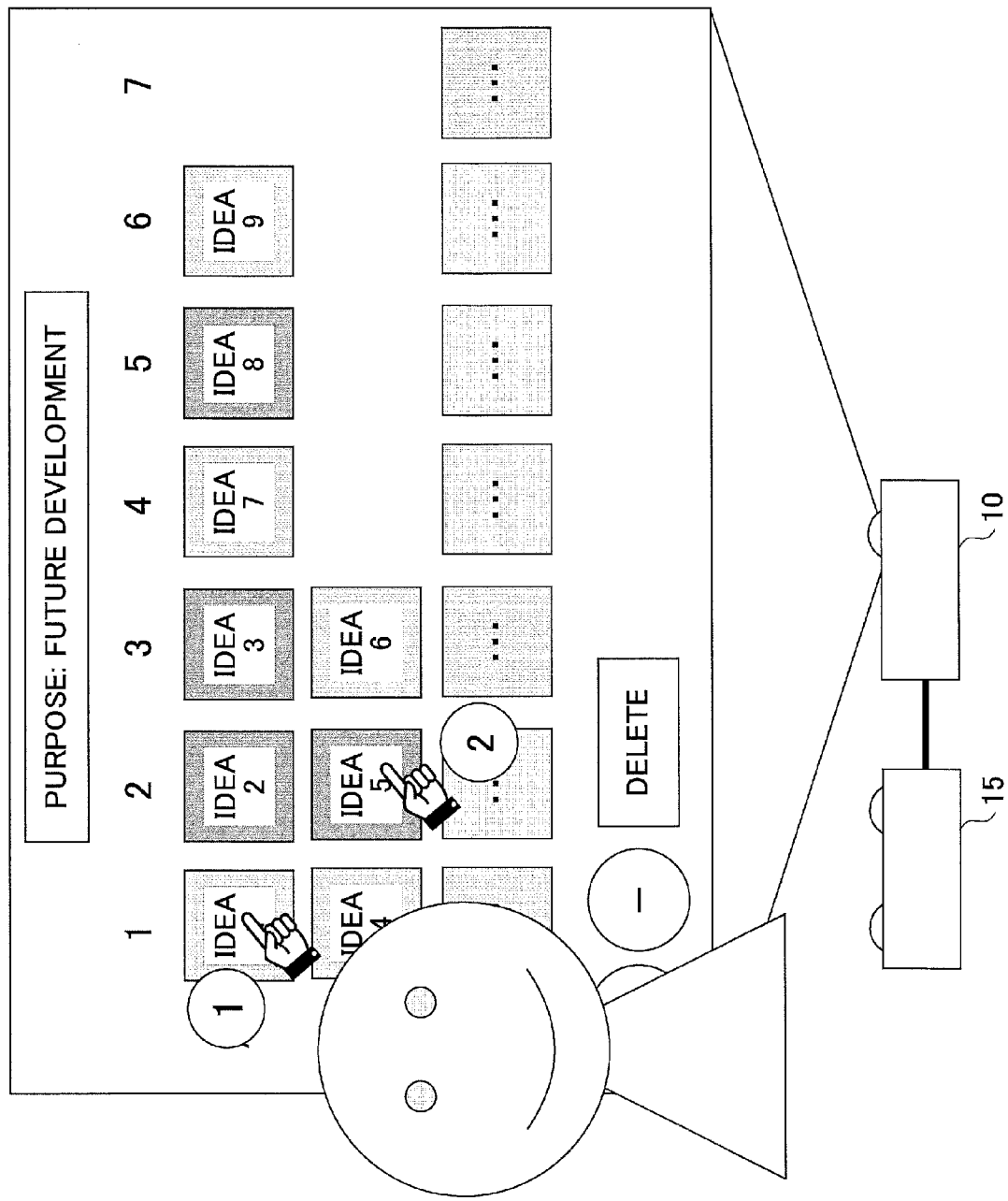
FIG. 20 is a drawing illustrating a touch detection using a distance measurement sensor.

FIG. 20 shows an example of the touch detection using a distance measurement sensor. In the example of FIG. 20, a distance measurement sensor 15 is connected to (or may be integrated in) the projection apparatus 10. The distance measurement sensor 15 may be, for example, a compound eye camera (stereo camera), an infrared sensor, a ultrasonic sensor or the like.

The distance measurement sensor 15 determines the position of the projection surface by using a plane surface approximation, and measures the distance to a pointing object such as a finger, a pointing bar or the like.

Based on the information acquired from the distance measurement sensor 15, the projection apparatus 10 determines that the pointing object is in contact with the projection surface when the distance between the plane surface and the pointing object is less than or equal to a threshold value. The projection apparatus 10 transmits the information of the touched position to the server 20.

When the server 20 determines that the position based on the acquired information is moved from a position on a sticky note data to an area where no sticky note data exist, the server 20 moves the sticky note data to the area.

Figure 21:
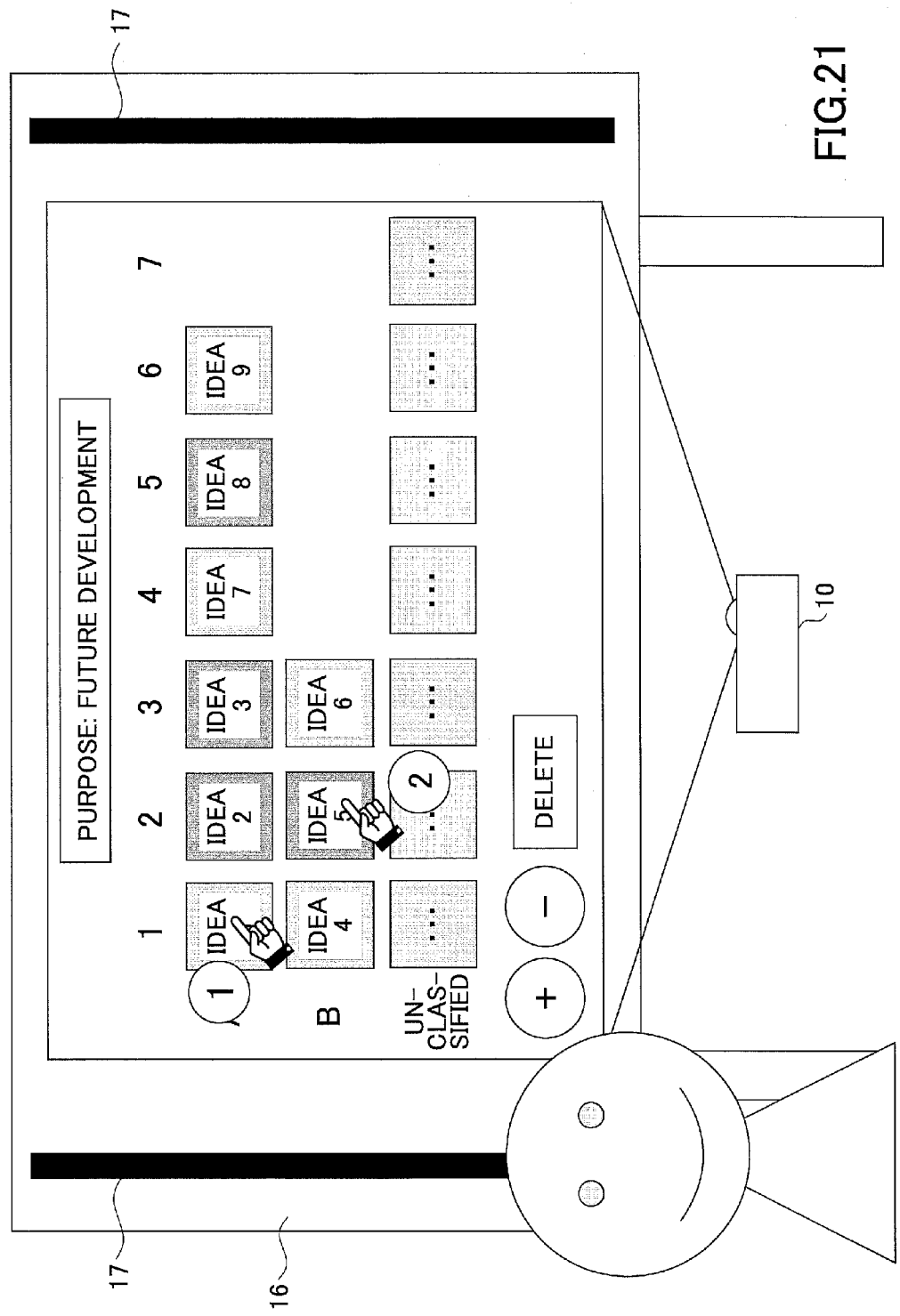
FIG. 21 is a drawing illustrating the touch detection using a board including touch sensors.

FIG. 21 shows an example where the touch detection is done by using a board including touch sensors. In the example of FIG. 21, the projection apparatus 10 projects a display screen on a board 16 including touch sensors 17. When the touch is detected by the touch sensor 17 in the board 16, the positional information of the touched position is transmitted to the projection apparatus 10.

The projection apparatus 10 acquires the positional information of the touched position detected by the touch sensor 17, and transmits the acquired positional information to the server 20.

When the server 20 determines that the position based on the acquired positional information is moved from a position on a sticky note data to an area where no sticky note data exist, the server 20 moves the sticky note data to the area.

Figure 22:
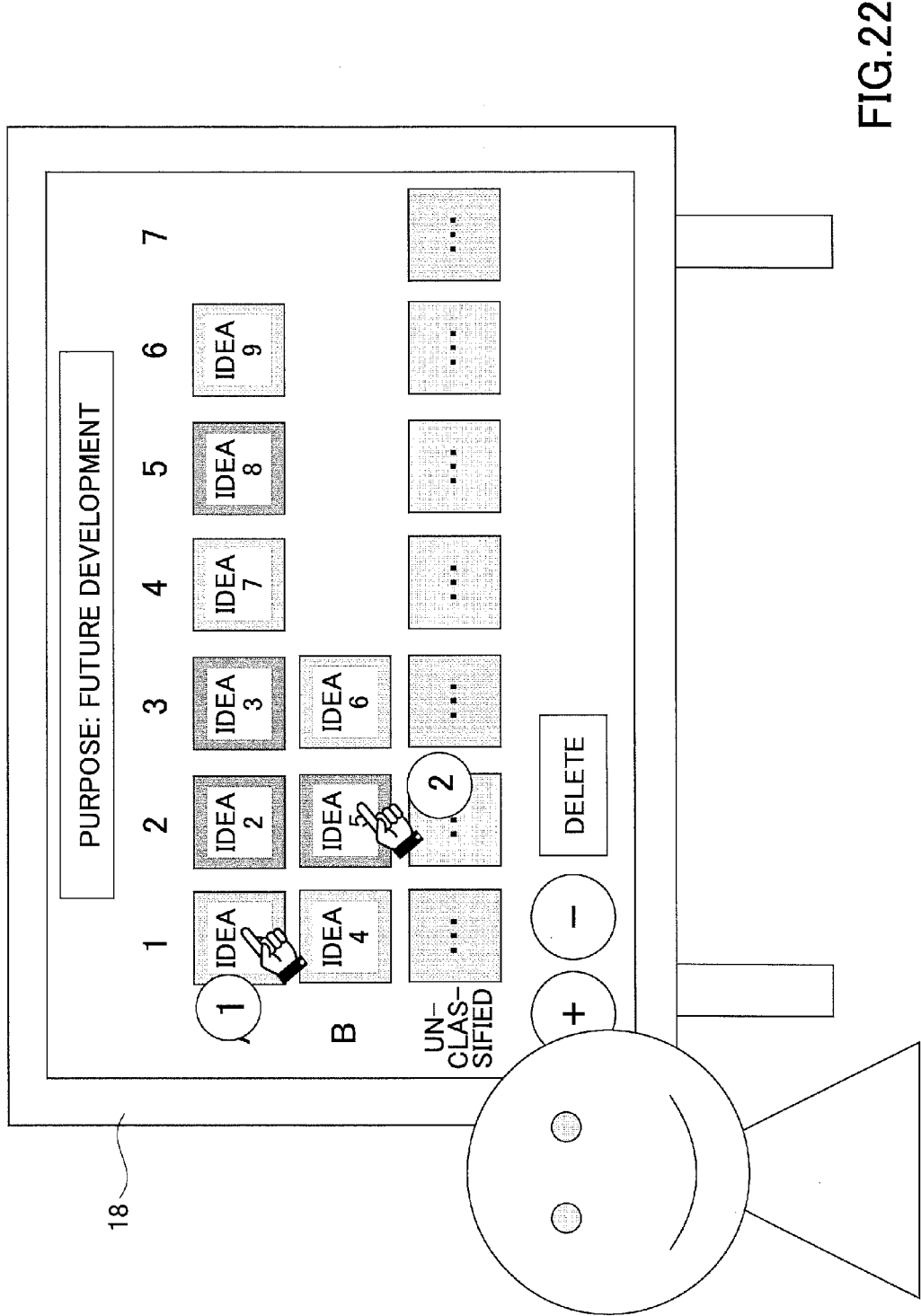
FIG. 22 a drawing illustrating the touch detection using a display device including touch sensors.

FIG. 22 shows an example where the touch detection is done by using a display including touch sensors. In the example of FIG. 22, a display screen is displayed on a display 18 including touch sensors. In the example of FIG. 22, the projection apparatus 10 is not necessary, and a meeting terminal is alternatively prepared.

The meeting terminal outputs the display screen information received from the server 20 to the display 18 including touch sensors. The display 18 including touch sensors displays the display screen and detect a touch on the display.

The display 18 including touch sensors transmits the positional information indicating the touched position to the meeting terminal. The meeting terminal transmits the positional information indicating the touched position detected by the display 18 including touch sensors to the server 20.

When the server 20 determines that the position based on the acquired positional information acquired from the meeting terminal is moved from a position on a sticky note data to an area where no sticky note data exist, the server 20 moves the sticky note data to the area.

According to the modified example, it becomes possible to realize an operation on a large screen, the operation being a movement of the sticky note data on the display screen of the PC Second Embodiment Next, an information processing system according to a second embodiment is described. In the second embodiment, instead of using the information processing apparatus to input data, for example, a camera including an imaging unit is used. As the camera, a mobile terminal including a camera may be used.

Figure 23:
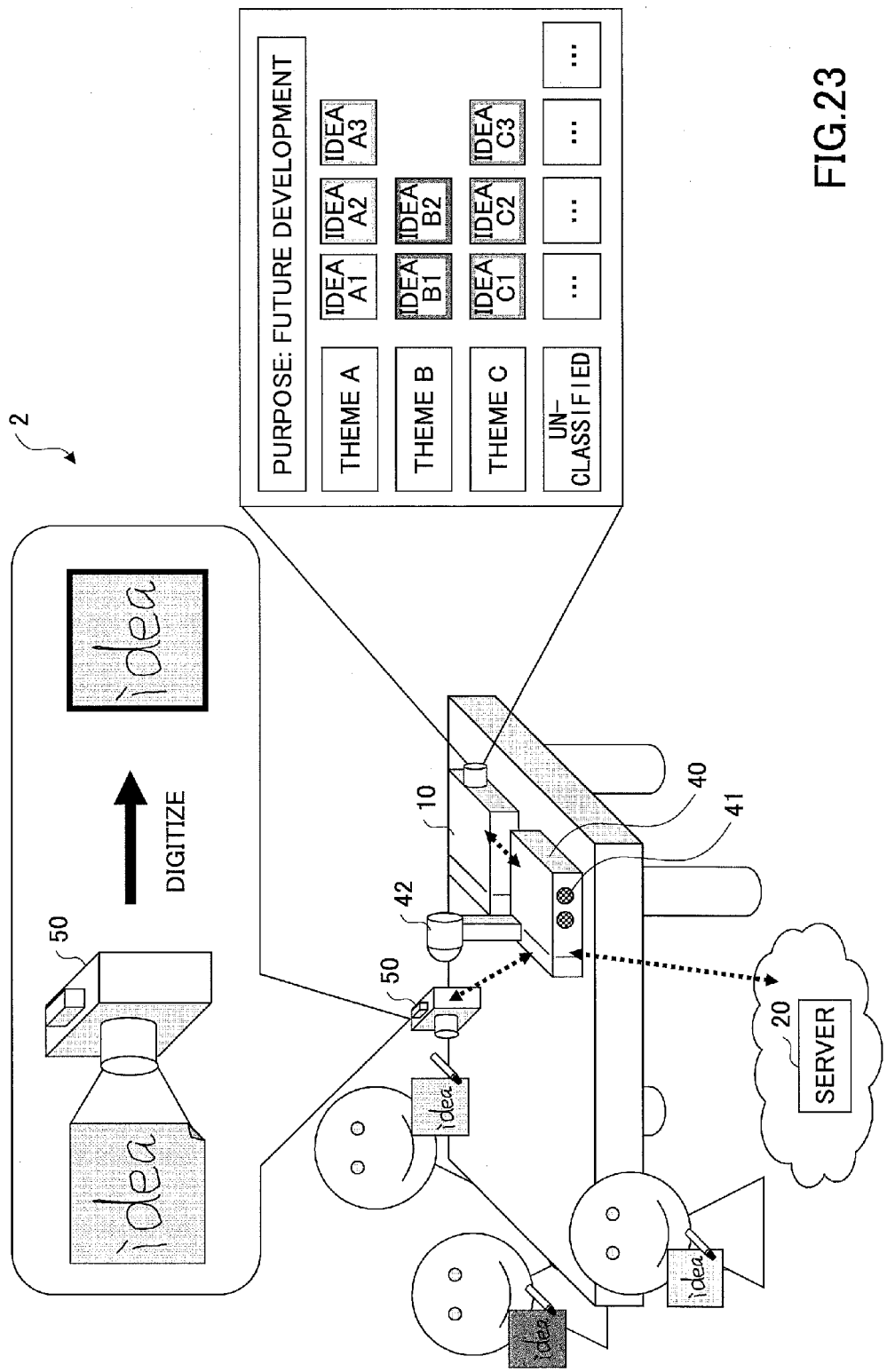
FIG. 23 is a drawing illustrating an example information processing system according to a second embodiment.

FIG. 23 shows an example information processing system 2 according to a second embodiment. As shown in FIG. 23, the information processing system 2 includes the projection apparatus 10, the server 20, a meeting terminal 40, and a camera 50 which are connected to each other wirelessly or using cables so as to perform data communications with each other.

In this second embodiment, the image data (sticky note data) captured by the camera 50 are transmitted to the meeting terminal 40. The meeting terminal 40 transmits the image data acquired from the camera 50 to the server 20.

Unlike the first embodiment, the server 20 monitors a communication state of the communications with the meeting terminal 40. Here, it is assumed that there are a plurality of meeting terminals 40 prepared. In this case, if the server detects the communication error and the recovery from the communication error in the communications with the meeting terminals 40, the server 20 performs the processes described in the first embodiment in which the information processing apparatuses 30 are replaced by the meeting terminals 40.

By doing this, even if the communication error occurs in a meeting terminal 40 in a certain region, the server 20 may transmit the video of the display screen during the communication error, so that the same effects as those in the first embodiment may be obtained.

Configuration

Figure 24:
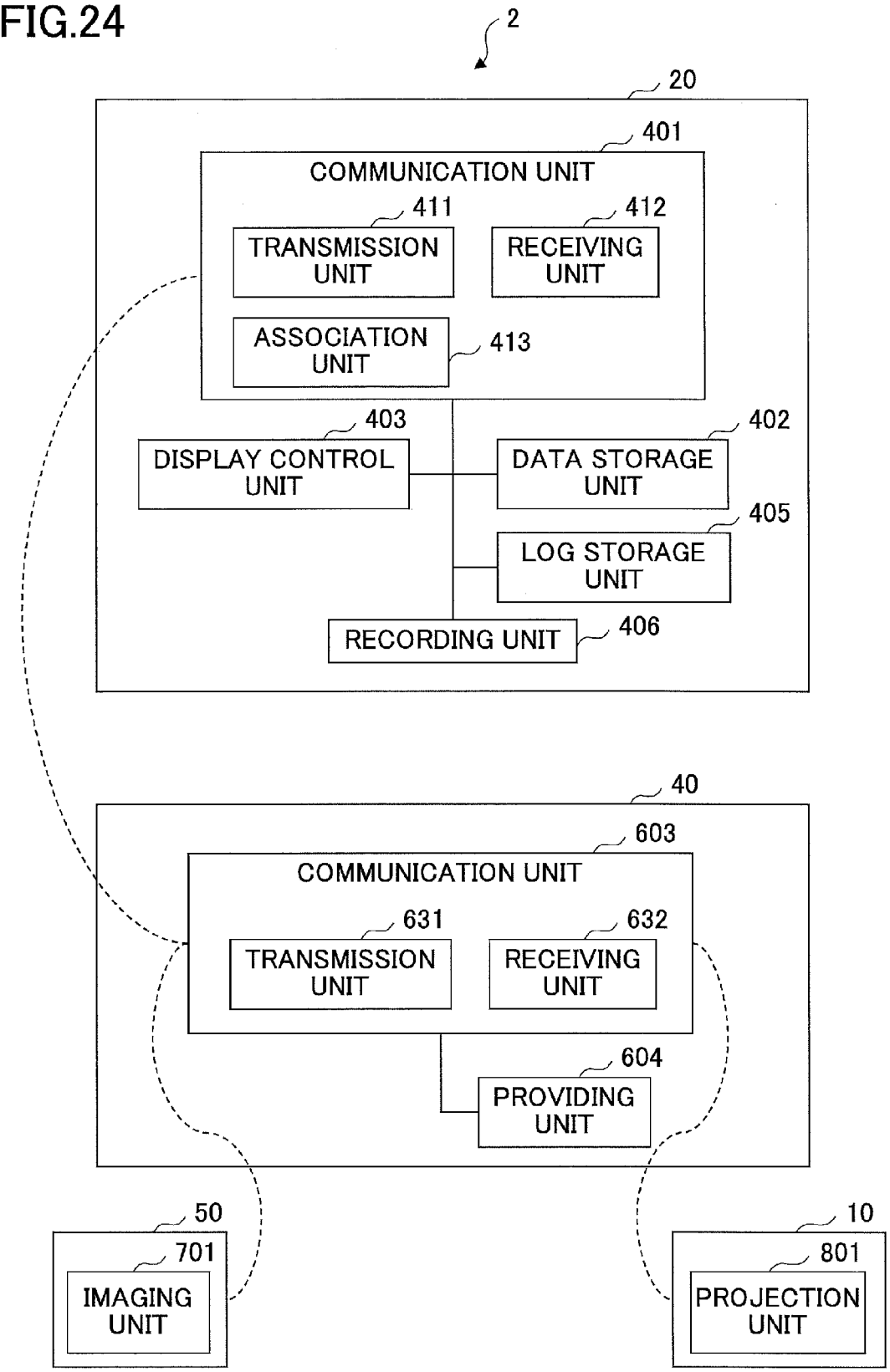
FIG. 24 is a drawing illustrating functions of apparatuses included in the information processing system according to the second embodiment.

FIG. 24 is a block diagram illustrating an example configuration of the apparatuses in the information processing apparatus according to the second embodiment.

The camera 50 in the second embodiment includes an imaging unit 701. The imaging unit 701 images characters and an image depicted on the sticky note or the like, and generates the image data (e.g., the sticky note data). The camera 50 transmits the generated image data to the meeting terminal 40.

The meeting terminal includes a communication unit 603 and a providing unit 604. The processes performed by the communication unit 603 and the providing unit 604 are basically the same as those of the communication unit 503 and the providing unit 504 in the first embodiment.

A receiving unit 632 included in the communication unit 603 transmits the image data acquired from the camera 50 to the server 20. A transmission unit 631 included in the communication unit 631 transmits the display screen information acquired from the server 20 to the projection apparatus 10.

The projection apparatus 10 includes a projection unit 801. The projection unit 801 projects a display screen on a projection surface, the display screen being based on the display screen information acquired from the meeting terminal 40. Further, the projection apparatus 10 may project a video that is played back by the providing unit 604.

The functions of the server 20 are basically the same as those described in the first embodiment, but differs from the those in that the server 20 in the second embodiment monitors the communication state of the communications with the meeting terminals 40.

Further, in the second embodiment, the touch detection is done by using the touch sensing described in the modified embodiment, so that the projected data (sticky note data) are moved.

As described above, according to the second embodiment, the analog data input by the camera 50 or the like are digitized, and the digitized data are transmitted to the server 20 as the image data.

Further, according to the second embodiment, it is not necessary to prepare the same number of the information processing apparatuses 30 for data input as those of the users (participants) of the meeting. Further, according to the second embodiment, conventional tools such as sheets, pens, and the camera 50 are used. Therefore, a remote meeting (e.g., idea generation remote meeting) between separated areas may be conducted while a comfortable environment where pens and sheets can be used is maintained.

Third Embodiment

Next, an information processing system according to a third embodiment is described. In the third embodiment, the information processing system includes only the information processing apparatuses 30. To that end, for example, one information processing apparatus (hereinafter "parent apparatus") includes the functions of the server 20. The parent apparatus displays the display screen (shared view) on the display part thereof.

System

Figure 25:
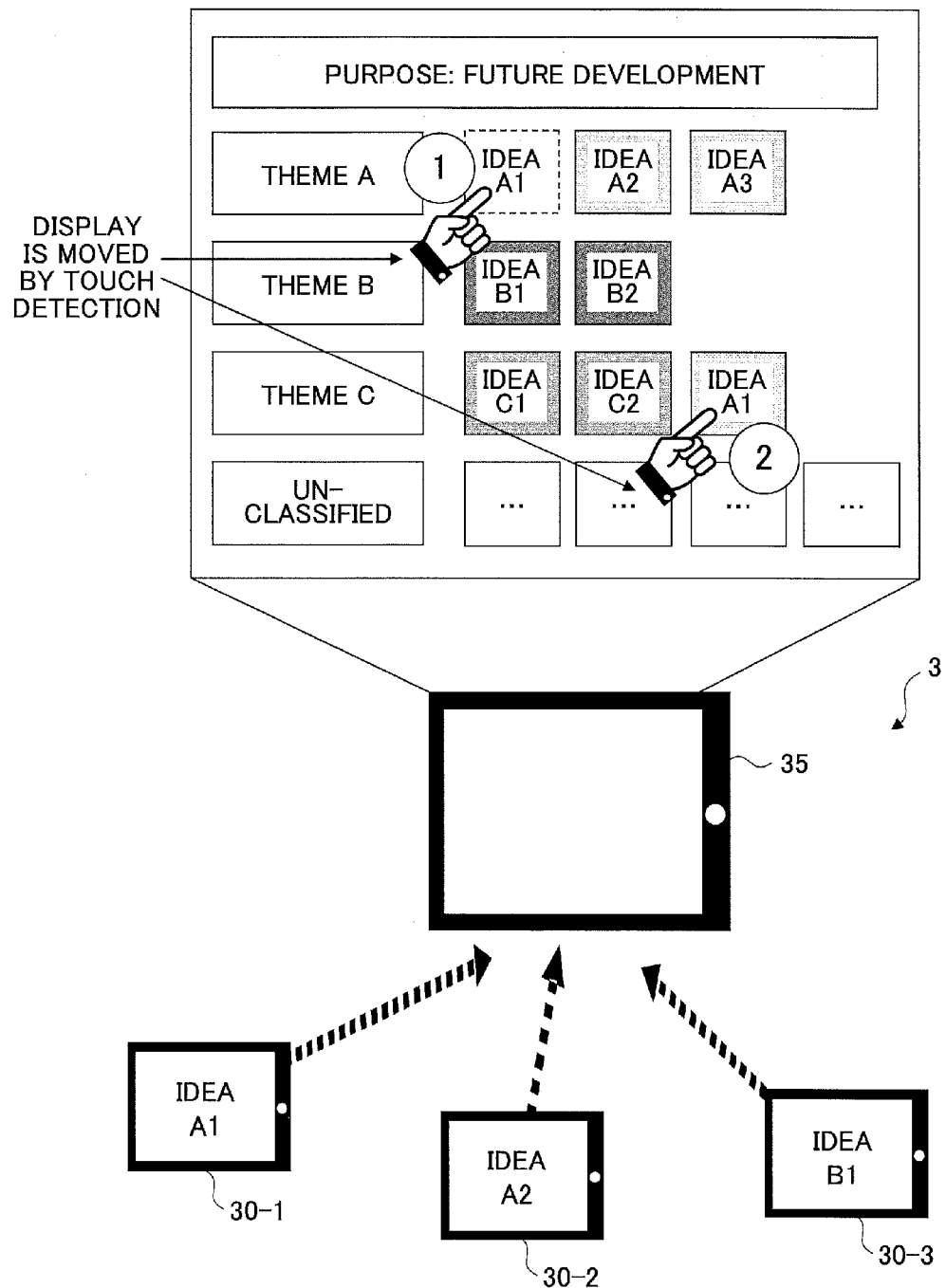
FIG. 25 is a drawing illustrating an example information processing system according to a third embodiment.

FIG. 25 illustrates an example of the information processing system 3 according to the third embodiment. As shown in FIG. 25, a first apparatus 35 is similar to the information processing apparatuses 30, and receives data from the information processing apparatuses 30. The first apparatus 35 includes the functions of the server 20. Therefore, the first apparatus 30 generates and display the display screen including the data.

Further, when the first apparatus 35 includes a touch panel, the touch detection of the above described process may be replaced by the touch detection on the touch panel of the first apparatus 35. Accordingly, in the first apparatus 35, it becomes possible to move the sticky note data based on the touch detection.

The information processing system 3 according to the third embodiment may be realized by installing a program to execute the functions of the first apparatus 35 in a predetermines apparatus and further installing a program to execute the functions of the information processing apparatus 30 into the information processing apparatuses 30.

Figure 26:
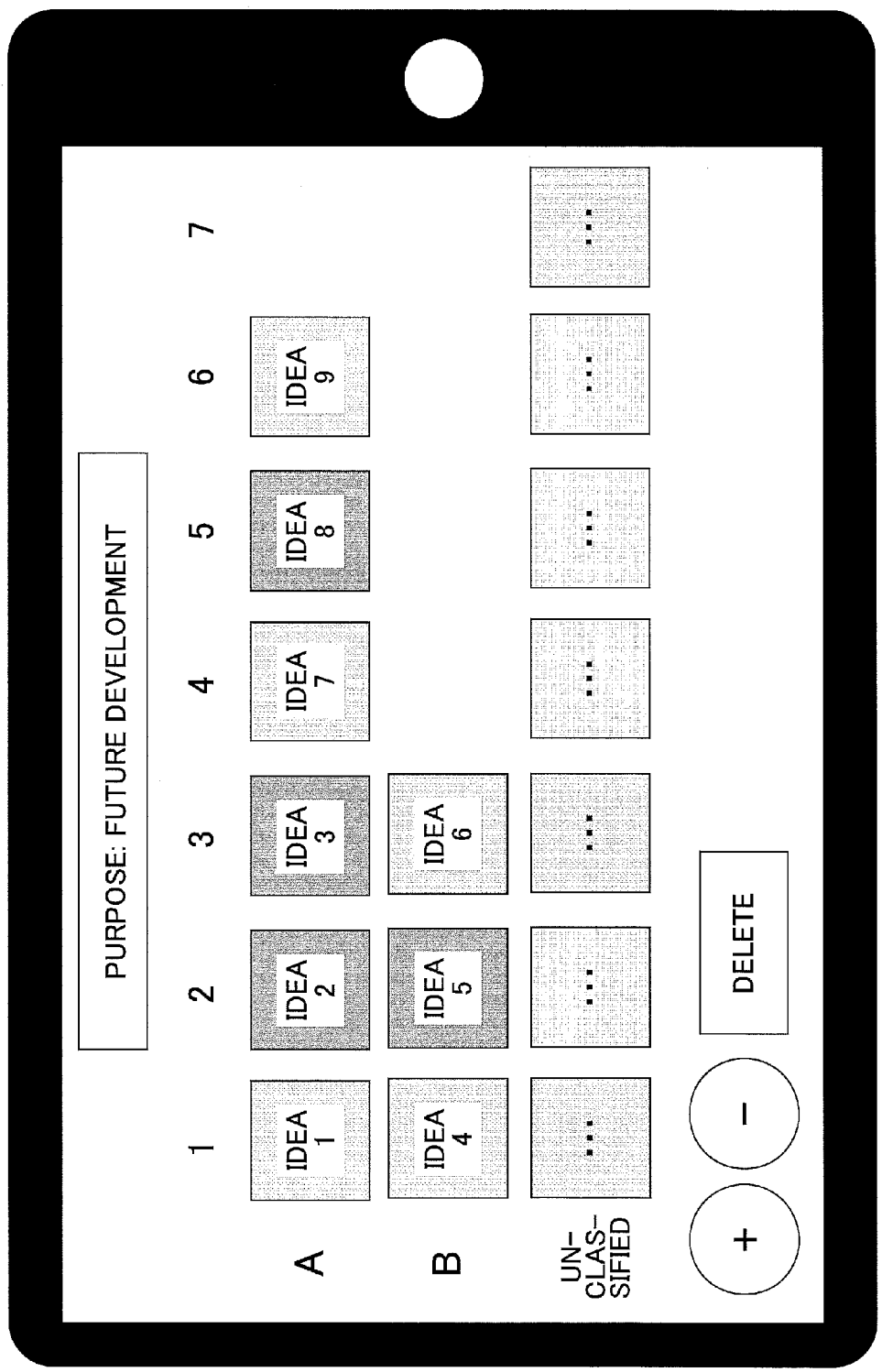
FIG. 26 is a drawing illustrating an example of a display screen displayed on a first apparatus according to the third embodiment.

FIG. 26 shows an example display screen to be displayed on the first apparatus 35 according to the third embodiment. In the example of FIG. 26, a tablet terminal is used as the first apparatus 35.

As described above, according to the third embodiment, the information processing system of the present invention may be realized with only the information processing apparatuses 30.

Further, the program to be executed in the apparatuses in the embodiments including the modified example described above may be recorded in a computer-readable recording medium in an installable format or as a file in an executable file, such as on a CD-ROM, a flexible disk (FD), a CD-R, a digital versatile disk (DVD) or the like.

Further, the program to be executed in the apparatuses in the embodiments and the modified example may be stored in a computer connected to a network such as the Internet, so that the program may be provided by downloading the program via the network.

Further, the program to be executed in the apparatuses in the embodiments and the modified example may be provided (prepared) so as to be provided or distributed via a network including the Internet.

Further, the program to be executed in the apparatuses in the embodiments and the modified example may be previously installed in a ROM or the like so as to be distributed.

It should be noted that the configuration or the like of the information processing apparatus, the information processing system, and the program according to the embodiment and modified example are not limited to those described in the embodiment and modified example, and may be appropriately modified in the practical use without departing from the scope of the present invention.

Further, various inventions may be made based on a combination of the plural configurations described in the above embodiments and the modified example. Such modification includes the partial removal of the elements from all the elements described in the embodiment and the modified example.

According to an embodiment of the present invention, it may become possible for a user, who is unable to participate in a meeting due to a communication error, to return to the meeting smoothly in a computerized meeting in order to continue bounce ideas off of others among the users.

According to an embodiment, a non-transitory recording medium storing a computer-readable program to be executed in a computer to execute the method including a receiving step of receiving data input to one or more apparatuses; a data storing step of storing the data with a determined display position thereof in a display screen; a log storing step of storing a data change as a log, the data change being displayed in the display screen; an associating step of monitoring a communication status of a communication with the one or more apparatuses, and associating information indicating an apparatus where a communication error occurs or an apparatus where the communication is recovered from the communication error and a timing when the communication error occurs or when the communication is recovered from the communication error with the log; a recording step of recording video of the data change displayed in the display screen from when the communication error occurs until when the communication is recovered for an apparatus; and a transmitting step of, when the receiving unit receives a request for acquiring the video from an apparatus where the communication is recovered, transmitting the video from an event when the communication error occurs until an event when the communication is recovered and the log to the apparatus.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
a memory storing computer-readable instructions;
one or more processors configured to execute the computer-readable instructions such that the one or more processors are configured to perform operations including,
receiving data input to one or more apparatuses, the input data identifying one or more notes,
storing the input data with one or more determined display positions of the one or more notes on a display screen,
storing a plurality of data changes as a log such that each of the plurality of stored data changes,
identifies a note, from among the one or more notes, and
indicates a change in a manner in which the identified note is being displayed on the display screen,
monitoring a communication status of a communication with the one or more apparatuses, and associate information indicating an apparatus where a communication error occurs or an apparatus where the communication is recovered from the communication error and a timing when the communication error occurs or when the communication is recovered from the communication error with the log,
recording video of the plurality of data changes displayed in the display screen from when the communication error occurs until when the communication is recovered for an apparatus, and
when a request for acquiring the video from an apparatus where the communication is recovered is received, transmitting the video from an event when the communication error occurs until an event when the communication is recovered along with the log to the apparatus.

2. An information processing apparatus according to claim 1, wherein the one or more processors are configured to execute the computer-readable instructions such that the one or more processors are configured to,
record voice in association with the video, and
transmit the log, the video, and voice from the event when the communication error occurs until the event when the communication is recovered to the apparatus.

3. An information processing apparatus according to claim 1, wherein the one or more processors configured to execute the computer-readable instructions such that the one or more processors are configured to store a time of the data change using a displayed time in the video.

4. An information processing apparatus according to claim 1,
wherein the input data refers to a sticky note data, and
wherein the sticky note data displayed in the display screen is movable in the display screen.

5. A computer-executable information processing method comprising:
receiving data input to one or more apparatuses, the input data identifying one or more notes;

storing the input data with one or more determined display positions of the one or more notes on a display screen;

storing a plurality of data changes as a log such that each of the plurality of stored data changes, identifies a note, from among the one or more notes, and indicates a change in a manner in which the identified note is being displayed on the display screen;

monitoring a communication with the one or more apparatuses, and associating information indicating an apparatus where a communication error occurs or an apparatus where the communication is recovered from the communication error and a timing when the communication error occurs or when the communication is recovered from the communication error with the log, recording video of the plurality of data changes displayed in the display screen from when the communication error occurs until when the communication is recovered from the communication error for an apparatus; and when a request for acquiring the video from an apparatus where the communication is recovered from the communication error is received, transmitting the video from an event when the communication error occurs until an event when the communication is recovered along with the log to the apparatus.

6. An information processing system including a plurality of information processing apparatuses, including a first information processing apparatus, connected to each other via a network, wherein the first information processing apparatus includes, a first memory storing first computer-readable instructions;

one or more first processors configured to execute the first computer-readable instructions such that the one or more processors are configured to perform operations including, receiving data input to one or more information processing apparatuses, the input data identifying one or more notes, storing the input data with one or more determined display positions of the one or more notes on a display screen, storing a plurality of data changes as a log such that each of the plurality of stored data changes, identifies a note, from among the one or more notes, and indicates a change in a manner in which the identified note is being displayed on the display screen, monitoring a communication status of a communication with the one or more apparatuses, and associate information indicating an apparatus where a communication error occurs or an apparatus where the communication is recovered from the communication error and a timing when the communication error occurs or when the communication is recovered from the communication error with the log, recording video of the plurality of data changes displayed in the display screen from when the communication error occurs until when the communication is recovered for an apparatus, and when a request for acquiring the video from an apparatus where the communication is recovered is received, transmitting the video from an event when the communication error occurs until an event when the communication is recovered along with the log to the apparatus, and wherein at least one of the one or more information processing apparatuses includes, a second memory storing second computer-readable instructions;

one or more second processors configured to execute the second computer-readable instructions such that the one or more processors are configured to perform operations including, inputting data, transmitting the input data to the first information processing apparatus, and when the video and the log are received from the first information processing apparatus, playing back the video based on the log.

7. An information processing system according to claim 6, wherein the one or more second processors are configured to execute the second computer-readable instructions such that the one or more second processors are configured to store the input data while the communication error with the first information processing apparatus occurs.

\* \* \* \* \*